(12) United States Patent
Ono

(10) Patent No.: US 7,606,123 B2
(45) Date of Patent: Oct. 20, 2009

(54) LIGHT RECEIVING AND EMITTING INTEGRATED DEVICE, OPTICAL PICKUP PROVIDED THEREWITH, AND OPTICAL DISK APPARATUS

(75) Inventor: Nobumasa Ono, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 855 days.

(21) Appl. No.: 11/159,621

(22) Filed: Jun. 22, 2005

(65) Prior Publication Data

US 2005/0281141 A1   Dec. 22, 2005

(30) Foreign Application Priority Data

Jun. 22, 2004   (JP) .............................. 2004-183787

(51) Int. Cl.
*G11B 7/00*   (2006.01)
(52) U.S. Cl. .................................. 369/44.41
(58) Field of Classification Search ... 369/44.11–44.12, 369/44.41, 44.42, 112.01, 112.1, 112.03, 369/112.07, 124.12
See application file for complete search history.

(56) References Cited

U.S. PATENT DOCUMENTS

| | | | |
|---|---|---|---|
| 4,832,464 A | 5/1989 | Kato et al. | |
| 5,049,732 A | 9/1991 | Nagahama et al. | |
| 5,065,380 A * | 11/1991 | Yokota | 369/44.12 |
| RE35,332 E | 9/1996 | Nagahama et al. | |
| 6,664,998 B1 * | 12/2003 | Kyoya et al. | 347/241 |
| 7,227,819 B2 * | 6/2007 | Kadowaki et al. | 369/44.41 |
| 2002/0008888 A1 | 1/2002 | Ohyama | |
| 2002/0097773 A1 | 7/2002 | Masui et al. | |
| 2003/0076592 A1 | 4/2003 | Ohyama | |

FOREIGN PATENT DOCUMENTS

| | | | |
|---|---|---|---|
| JP | 58-208939 A2 | | 12/1983 |
| JP | 63-010492 B4 | | 3/1988 |
| JP | 63-228432 A2 | | 9/1988 |
| JP | 02-031336 A2 | | 2/1990 |
| JP | 02-068734 A2 | | 3/1990 |
| JP | 02-113450 A2 | | 4/1990 |
| JP | 06-077335 B4 | | 9/1994 |
| JP | 06-090798 B4 | | 11/1994 |
| JP | 07-003704 B4 | | 1/1995 |
| JP | 07-058559 B4 | | 6/1995 |
| JP | 10-49884 A | | 2/1998 |
| JP | 10269588 A | * | 10/1998 |
| JP | 2002-123967 | | 4/2002 |
| JP | 2002-203325 | | 7/2002 |
| JP | 2002-298423 | | 10/2002 |

* cited by examiner

*Primary Examiner*—Nabil Z Hindi
(74) *Attorney, Agent, or Firm*—Morrison & Foerster LLP

(57) ABSTRACT

A light receiving and emitting integrated device is provided that can be connected to an IC for an optical pickup of the discrete package type, regardless of use of the knife edge method for a focus servo signal. In the light receiving and emitting integrated device, a diffraction grating branches light emitted from a semiconductor laser into three, namely, first to third lights, a hologram element divided into four regions, namely, first to four regions divides the first to third lights reflected by an optical recording medium, and four light receiving segments provided in a light receiving element receive and detect the first light. A focus servo signal can be obtained by the knife edge method using detection outputs of the first light received and detected by the four light receiving segments.

6 Claims, 19 Drawing Sheets

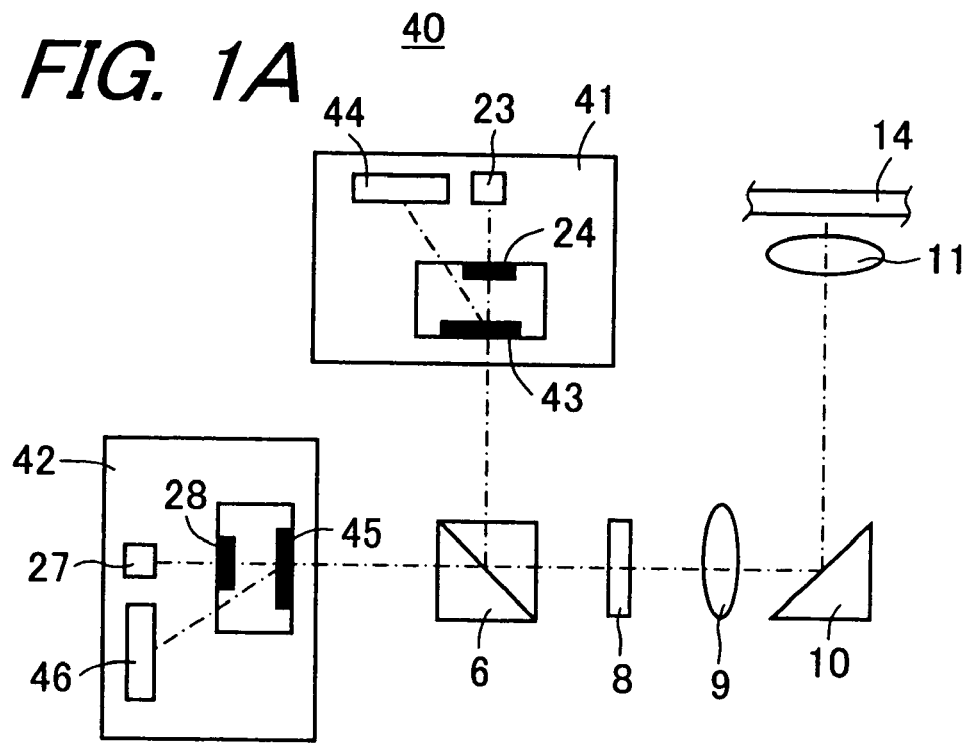
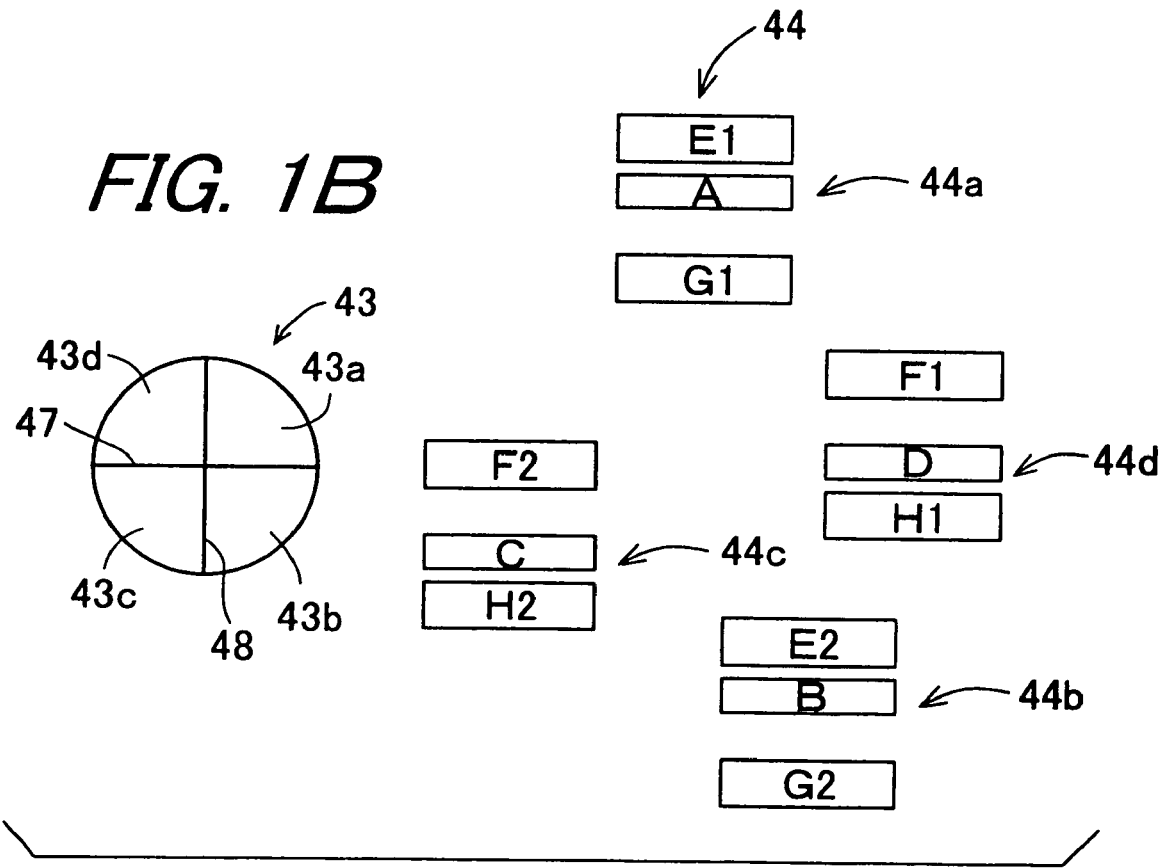

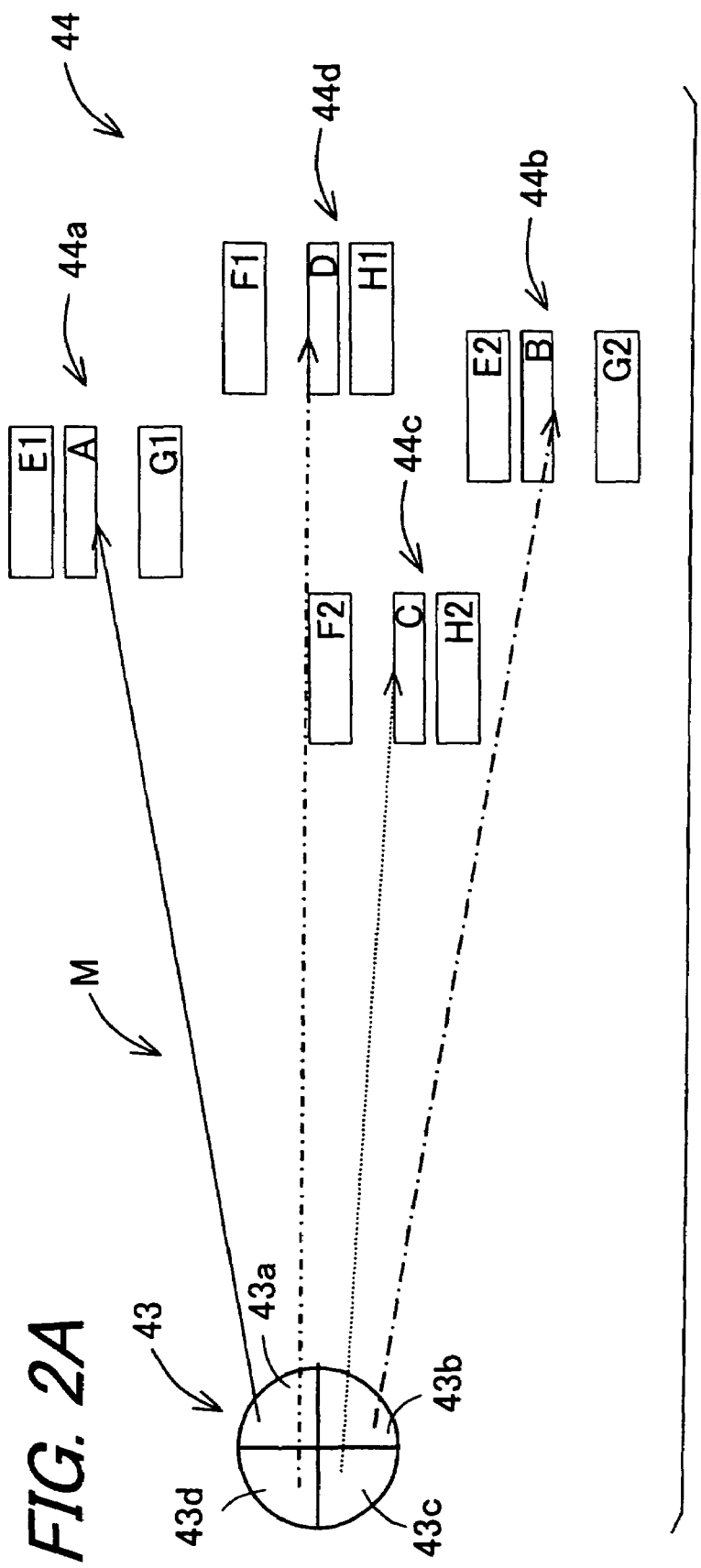

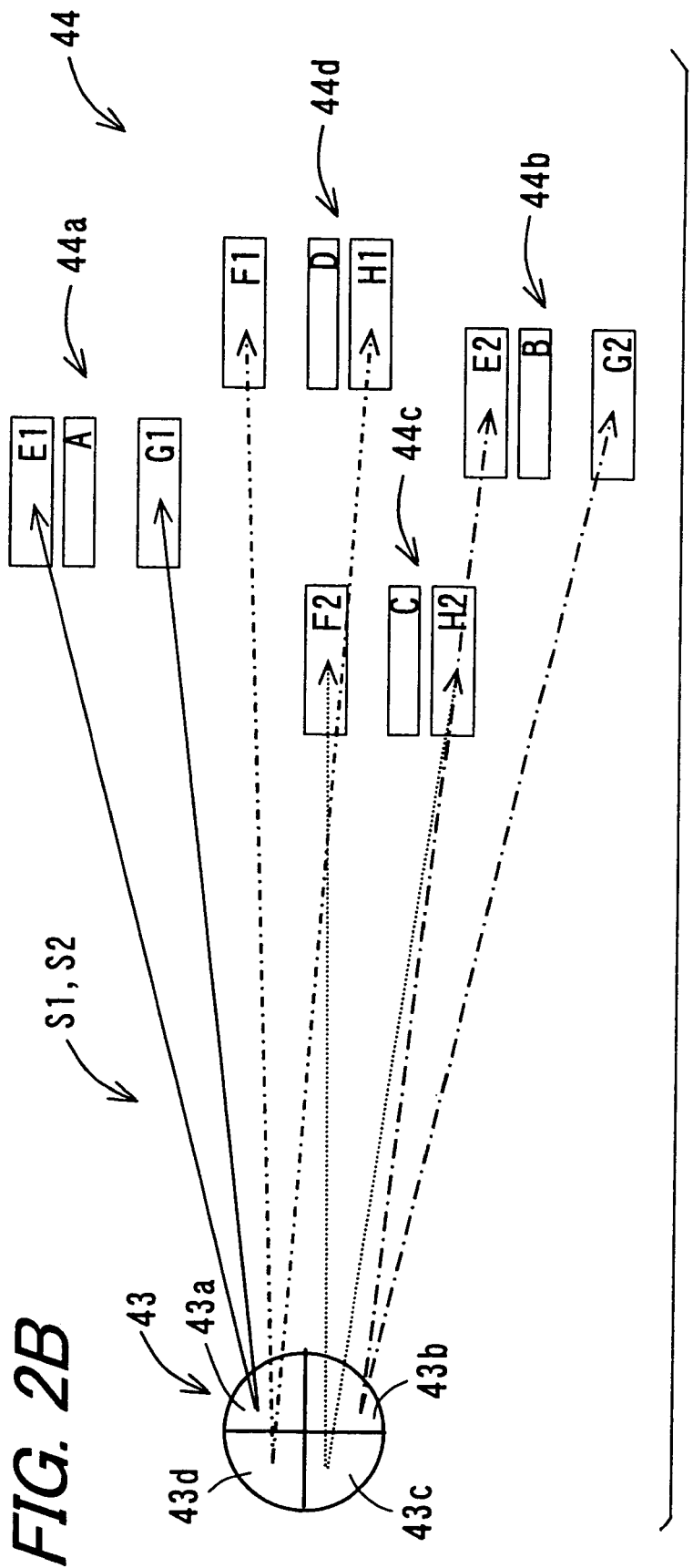

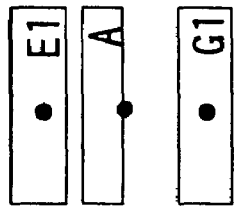
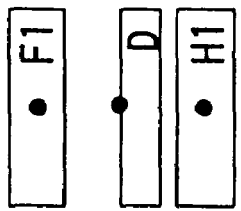
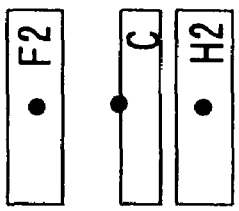
FIG. 3B FOCUS
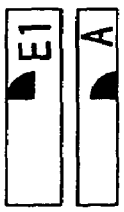
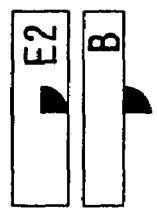
FIG. 3A DEFOCUS

FIG. 3C
DEFOCUS IN OPPOSITE DIRECTION TO FIG. 3A
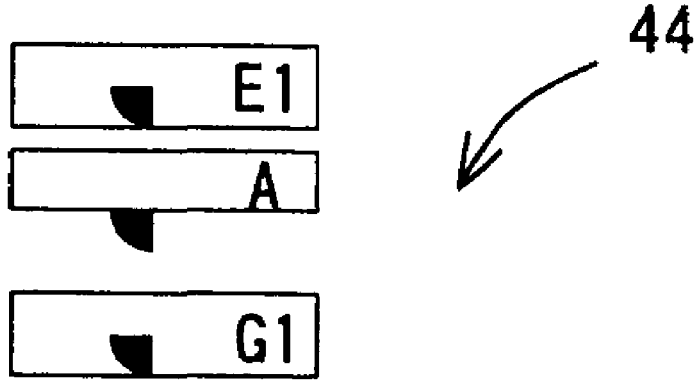

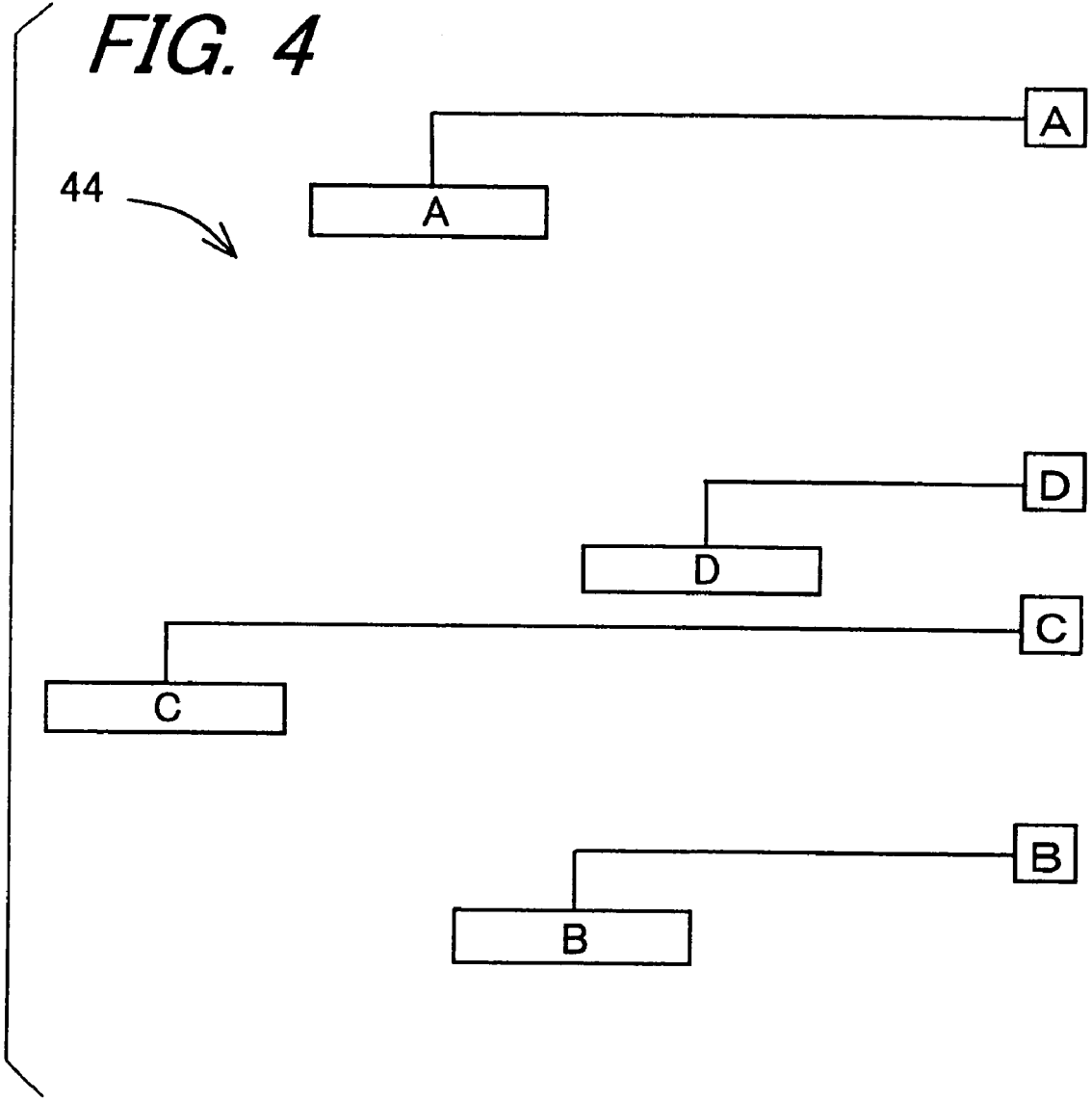

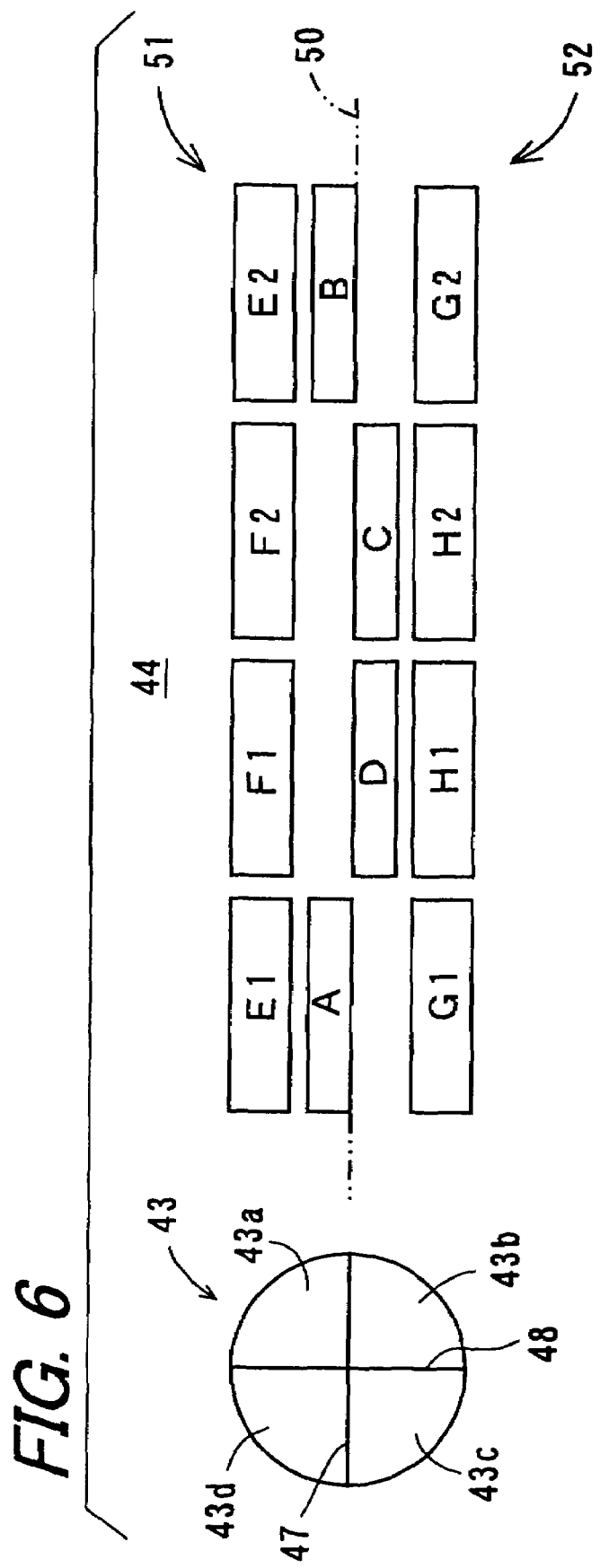

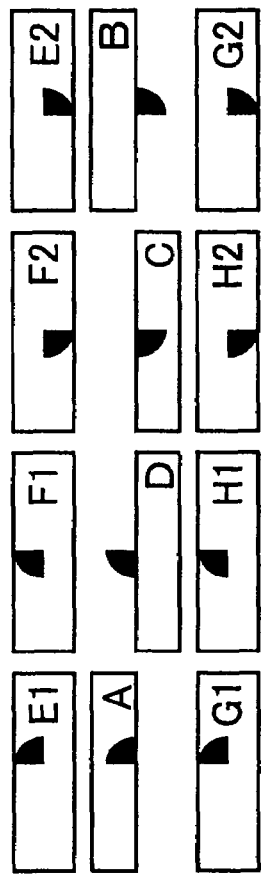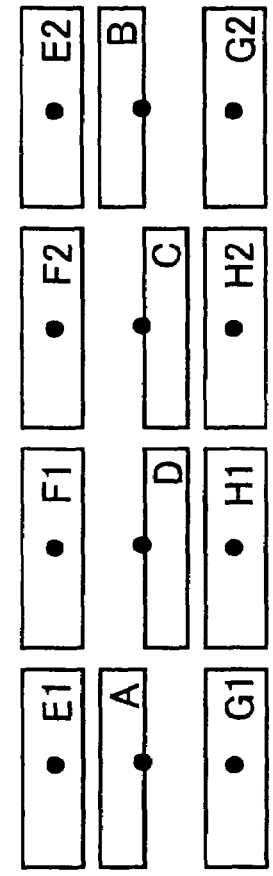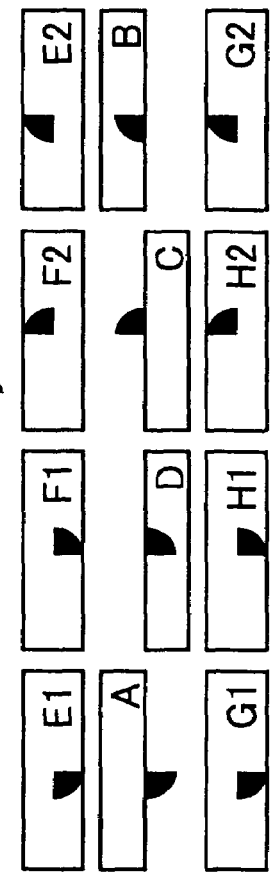
FIG. 7A DEFOCUS
FIG. 7B FOCUS
FIG. 7C DEFOCUS IN OPPOSITE DIRECTION TO FIG. 7A

DEFOCUS

FOCUS

DEFOCUS IN OPPOSITE DIRECTION TO FIG. 13A

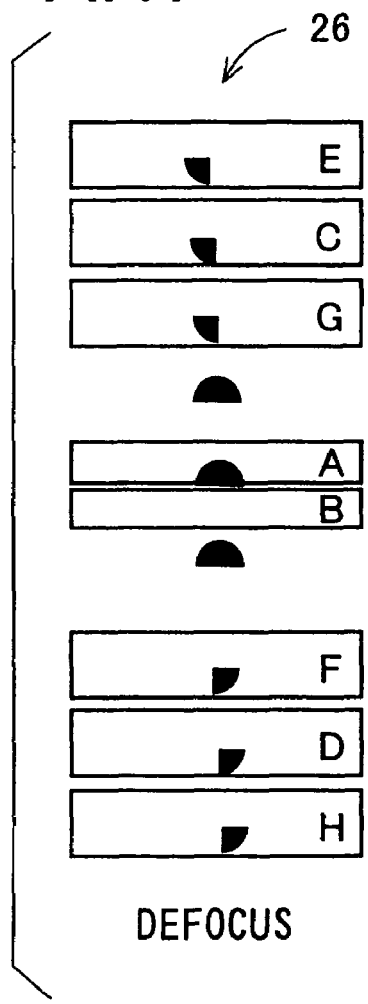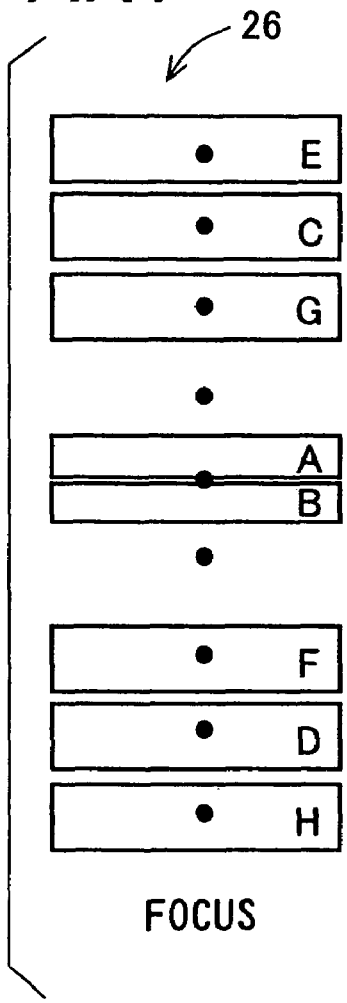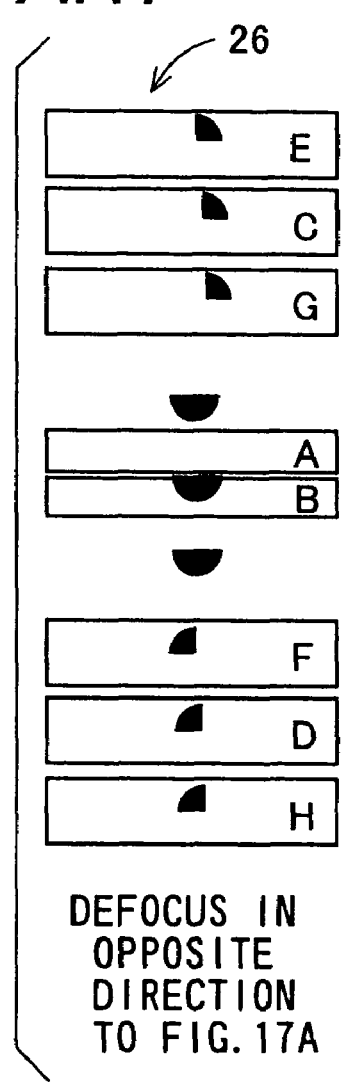

LIGHT RECEIVING AND EMITTING INTEGRATED DEVICE, OPTICAL PICKUP PROVIDED THEREWITH, AND OPTICAL DISK APPARATUS

CROSS-REFERENCE TO RELATED APPLICATION

This application claims priority to Japanese Patent Application No. JP 2004-183787, which was filed on Jun. 22, 2004, and the contents of which are incorporated herein by reference, in their entirety.

BACKGROUND OF THE INVENTION

1. Field of the Invention

The present invention relates to a light receiving and emitting integrated device, an optical pickup provided therewith, and an optical disk apparatus.

2. Description of the Related Art

The optical information recording/reproducing method that information is digitally recorded on an optical recording medium and reproduced from an optical recording medium using light has been widely used because the method has a large number of merits, for example, it is possible to perform recording/reproducing without contact, and the method is compatible with the respective forms of memories such as a playback-only type, a recordable type and a rewritable type.

As an optical pickup that is provided in an optical information recording and reproducing apparatus and that records information on an optical recording medium and/or reproduces information recorded on an optical recording medium using light, there are a so-called discrete package type using the combination of a light emitting element such as a laser diode (abbreviated to LD) and a light receiving element that are packaged separately, and a type using a light receiving and emitting integrated device such as a hologram laser in which a semiconductor chip as a light emitting element and a part of the optical components such as a light receiving element are integrated.

In both the types of optical pickups, in order to read an information signal of an optical recording medium or record an information signal on an optical recording medium, a focus servo signal and a track servo signal are necessary to condense light on a track of the optical recording medium and control its condensing state and its condensing position.

In general, an optical pickup of the discrete package type employs an astigmatic method for a focus servo signal, while an optical pickup of the type using the light receiving and emitting integrated device employs a knife edge method for a focus servo signal. Therefore, methods for detecting focus servo signals are different. Moreover, due to the difference in detecting methods, the optical pickup of the discrete package type and the optical pickup of the type using the light receiving and emitting integrated device have a difference in the division numbers of lights and operation equations that generate focus servo signals and track servo signals employed thereby.

FIG. 11 is a system view showing a configuration of a conventional optical pickup 1 of the discrete type in a simplified manner, and FIG. 12 is a plan view showing a configuration of a light receiving element 13 provided in the optical pickup 1 shown in FIG. 11. As an example of the optical pickup 1 of the discrete type, an apparatus that is compatible with two kinds of optical recording mediums using lights of different wavelengths for recording/reproducing of information, for example, a compact disk (abbreviated to CD) using an infrared light whose wavelength is 780 nm and a digital versatile disk (abbreviated to DVD) using a red light whose wavelength is 650 nm, will be shown.

The optical pickup 1 comprises a first semiconductor laser 2, a first diffraction grating 3, a second semiconductor laser 4, a second diffraction grating 5, a polarization beam splitter 6, a half mirror 7, a quarter-wave plate 8, a collimator lens 9, a lifting mirror 10, an objective lens 11, a coupling lens 12, and a light receiving element 13. The first semiconductor laser 2 emits the red light. The first diffraction grating 3 diffracts the light emitted from the first semiconductor laser 2. The second semiconductor laser 4 emits the infrared light. The second diffraction grating 5 diffracts the light emitted from the second semiconductor laser 2. The polarization beam splitter 6 transmits the light emitted from the first semiconductor laser 2 and reflects the light emitted from the second semiconductor laser 4. The half mirror 7 reflects the light from the polarization beam splitter 6. The quarter-wave plate 8 polarizes the light reflected by the half mirror 7. The collimator lens 9 substantially collimates the light passed through the quarter-wave plate 8. The lifting mirror 10 bends the light transmitted by the collimator lens 9 substantially at a right angle and guides to an optical recording medium 14. The objective lens 11 condenses the light reflected by the lifting mirror 10 to the optical recording medium 14. The coupling lens 12 condenses the light that is reflected by the optical recording medium 14, transmitted by the objective lens 11 again, reflected by the lifting mirror 10 and transmitted by the collimator lens 9, the quarter-wave plate 8 and the half mirror 7. The light receiving element 13 is irradiated with the light condensed by the coupling lens 12.

Although the optical pickup 1 of the discrete package type is provided with two semiconductor lasers, that is, the first and second semiconductor lasers 2, 4 that emit the lights of different wavelengths, respectively, the optical pickup 1 is provided with a single light receiving element 13 that receives a light reflected by the optical recording medium 14. The light receiving element 13 of this example comprises eight light receiving segments (A, B, C, D, E, F, G, H), four (A, B, C, D) of the light receiving segments are placed in the middle, and on both sides of the four light receiving segments (A, B, C, D), two groups of two light receiving segments (E, F), (G, H) are placed so as to be symmetrical with respect to the four light receiving segments (A, B, C, D).

For example, the light emitted from the first semiconductor laser 2 is diffracted into one main beam and two sub beams by the first diffraction grating 3. The main beam and the sub beams are condensed as three beam spots on a information recording surface of the optical recording medium 14, and the light receiving element 13 is irradiated with the three beams reflected by the optical recording medium 14 along the aforementioned light path. Hereinafter, irradiation of the light receiving element (the light receiving segments) with light will be referred to as incidence in some cases.

The main beam is incident on the four light receiving segments (A, B, C, D), and a reproduction signal of information recorded on the optical recording medium, a focus servo signal and a track servo signal are detected from the main beam. The two sub beams are incident on the two groups of two light receiving segments (E, F), (G, H), respectively, and the complementary signals of the track servo signal are detected from the sub beams.

FIGS. 13A to 13C are plan views showing states in which a main beam M and sub beams S1, S2 are incident on the light receiving element 13. In the optical pickup 1 of the discrete package type, a focus servo signal can be obtained by the astigmatic method. In the astigmatic method, beam spots M, S1, S2 form substantially circular shapes on the light receiving element 13 at the time of focus, and the beam spots M, S1, S2 form substantially oval shapes on the light receiving element 13 at the time of defocus.

When expressing signals detected from the respective light receiving segments (A, B, C, D, E, F, G, H) composing the light receiving element 13 by adding 'S' to each of the heads of the alphabets denoting the respective light receiving segments, the respective servo signals are generated by operation processing of equations (1) to (3) shown below.

Focus servo signal $FES=(SA+SC)-(SB+SD)$ (1)

Track servo signal $DPP=(SA+SB)-(SC+SD)-k\{(SE-SF)+(SG-SH)\}$ (2)

Track servo signal $DPD=(SA+SC)-(SB+SD)$ (Operation of phase difference) (3)

Here, k is an amplification factor set as necessary (as well as in equations shown hereinafter), and there are two operation equations for obtaining track servo signals because either one is selected and used depending on the kind of an optical recording medium such as a DVD or a CD, and depending on the use such as reproducing or recording. As shown in FIGS. 13A to 13C and the operation equations shown above, in the optical pickup 1, the main beam M is incident on the four light receiving segments (A, B, C, D), and a focus servo signal is obtained with the signals (SA, SB, SC, SD) detected by the four light receiving segments (A, B, C, D), respectively, by the astigmatic method. Track servo signals are obtained with the signals (SA, SB, SC, SD) detected by the four light receiving segments (A, B, C, D) on which the main beam M is incident and the signals (SE, SF, SG, SH) detected by the two groups of two light receiving segments (E, F), (G, H) on which the two sub beams S1, S2 are incident, respectively.

In the optical pickup 1 of the discrete package type configured so as to be compatible with different kinds of optical recording mediums such as CD and DVD using lights of different wavelengths, respectively, for recording/reproducing information as described above, in general, the lights of different wavelengths are caused to be incident on the same light receiving segments in the one light receiving element 13, and therefore the optical pickup 1 is configured so that output signals of CD and DVD are outputted from the same output terminals, and provided with merely one system of output terminals.

FIG. 14 is a system view showing the configuration of a conventional optical pickup 20 of the type using a light receiving and emitting integrated device in a simplified manner, and FIG. 15 is a plan view showing the configuration of a light receiving element 26 provided in the optical pickup 20 shown in FIG. 14. The optical pickup 20 of the type using a light receiving and emitting integrated device has a configuration similar to that of the optical pickup 1 of the discrete package type, so that similar portions will be denoted by the same reference numerals, and the description thereof will be omitted.

The optical pickup 20 of the type using a light receiving and emitting integrated device is characterized in that a light receiving and emitting integrated device in which at least a light emitting element and a light receiving element are integrally packaged is provided therein. In the optical pickup 20 shown as an example here, the light receiving and emitting integrated device is a hologram laser, and a first light receiving and emitting integrated device 21 that emits a red light and receives a light reflected by an optical recording medium, and a second light receiving and emitting integrated device 22 that emits an infrared light and receives a light reflected by the optical recording medium, are provided.

The first light receiving and emitting integrated device 21 comprises a first semiconductor laser 23, a first diffraction grating 24, a first hologram element 25 and a first light receiving element 26. The first semiconductor laser 23 emits a red light. The first diffraction grating 24 diffracts the light emitted from the first semiconductor laser 23. The first hologram element 25 divides and diffracts the light reflected by the optical recording medium 14 and causes to be incident on a first light receiving element 26. The first light receiving element 26 receives and detects light divided by the first hologram element 25. The second light receiving and emitting integrated device 22 is similar to the first light receiving and emitting integrated device 21 except that a semiconductor laser is a second semiconductor laser 27 that emits an infrared light, and comprises a second diffraction grating 28, a second hologram element 29, and a second light receiving element 30.

In the optical pickup 20 of the type using the light receiving and emitting integrated device, the light emitted from the first semiconductor laser 23 of the first light receiving and emitting integrated device 21 is received and detected by the first light receiving element 26 that is provided in the first light receiving and emitting integrated device 21 as well. The light emitted from the second semiconductor laser 27 of the second light receiving and emitting integrated device 22 is received and detected by the second light receiving element 30 that is provided in the second light receiving and emitting integrated device 22 as well.

The first and second light receiving elements 26, 30 are configured in the same manner, and comprise one group of two light receiving segments (A, B), and two groups of three light receiving segments (G, C, E), (F, D, H) which are placed symmetrically with respect to the two light receiving segments (A, B), respectively.

FIGS. 16A and 16B are views each showing a state in which a light reflected by the optical recording medium 14 is divided with the first hologram element 25 and caused to be incident on the first light receiving element 26, and FIGS. 17A to 17C are views showing states of light caused to be incident on the first light receiving element 26 at the time of focus and at the time of defocus. Since the first and second light receiving and emitting integrated devices 21, 22 perform the same light receiving operation, the first light receiving and emitting integrated device 21 will be described as a representative example. The first hologram element 25 is a light dividing element that has three divided regions, that is, first to third regions 25a, 25b, 25c and that divides light. The first hologram element 25 has a plane shape formed into a circle, which is firstly divided into two regions of the third region 25c and the remaining region by a first dividing line 31 passing through the center of the circle, and the remaining region of which is subsequently divided to the first and second regions 25a, 25b by a second dividing line 32 so as to intersect the first dividing line 31 at right angles, whereby it is formed so as to have three regions, that is, the first to third regions 25a, 25b, 25c. The first hologram element 25 is capable of diffracting light entering each of the three regions at each of the regions to divide the light.

The fact that the light emitted from the first semiconductor laser 23 is diffracted into one main beam and two sub beams by the first diffraction grating 24, and the main beam and the sub beams are reflected by the optical recording medium 14, is the same as in the optical pickup 1 of the discrete package type. The main beam M and the sub beams S1, S2 are further divided into three, respectively, by the first hologram element 25 divided into three regions, and caused to be incident on the first light receiving element 26.

FIG. 16A shows a state in which the main beam M is divided into three by the first hologram element 25 and caused to be incident on the first light receiving element 26, and FIG. 16B shows a state in which the sub beams S1, S2 are divided into three, respectively, by the first hologram element 25 and caused to be incident on the first light receiving element 26. The main beam M is divided into three by the first hologram element 25, and the three lights are caused to be incident on the two light receiving segments (A, B), the light receiving segment (C) of the three light receiving segments on one side, and the light receiving segment (D) of the three light receiving segments on the other side, respectively.

Further, the sub beams S1, S2 are divided into three by the first hologram element 25, respectively, and the sub beams S1, S2 diffracted by the first region 25a are caused to be incident on the light receiving segments (E, G) of the three light receiving segments on one side, and the sub beams S1, S2 diffracted by the second region 25b are caused to be incident on the light receiving segments (F, H) of the three light receiving segments on the other side. The sub beams S1, S2 diffracted by the third region 25c are caused to be incident between the two light receiving segments (A, B) and the three light receiving segments (G, C, E) on one side and between the two light receiving segments (A, B) and the three light receiving segments (F, D, H) on the other side, respectively.

In the optical pickup 20 of the type using a light receiving and emitting integrated device, a focus servo signal is obtained by the knife edge method. In the knife edge method, the beam spots M, S1, S2 form substantially circular shapes on the first light receiving element 26 at the time of focus, and the beam spots M, S1, S2 form shapes dependent on the respective regions of the first hologram element 25 on the light receiving element 26 at the time of defocus.

When expressing signals detected from the respective light receiving segments (A, B, C, D, E, F, G, H) composing the first light receiving element 26 by adding 'S' to each of the heads of the alphabets denoting the respective light receiving segments, the respective servo signals are generated by operation processing of equations (4) to (6) shown below.

Focus servo signal $FES=(SA-SB)$ (4)

Track servo signal $DPP=(SC-SD)-k\{(SE-SF)+(SG-SH)\}$ (5)

Track servo signal $DPD=(SC-SD)$(Operation of phase difference) (6)

As shown in FIGS. 16A and 16B and the operation equations shown above, in the optical pickup 20, a focus servo signal is obtained from signals (SA, SB) detected by the light receiving segments (A, B) by dividing the main beam M into three by the first hologram element 25 and causing one of the lights to be incident on and condensing so as to extend over the two light receiving segments (A, B). Track servo signals are obtained from signals (SC, SD) that the remaining two of the divisions of the main beam M divided into three by the first hologram element 25 are detected by the light receiving segments (C), (D) of the respective groups of three light receiving segments, and from signals (SE, SG, SF, SH) detected by the light receiving segments (E, G), (F, H) of the respective groups of three light receiving segments, of the sub beam S1, S2 divided into three by the first hologram element 25.

The optical pickup 20 of the type using a light receiving and emitting integrated device as described above is provided with the second light receiving and emitting integrated device 22 for recording/reproducing on/from CD and the first light receiving and emitting integrated device 21 for recording/reproducing on/from DVD, provided with the first and second light receiving elements 26, 30 individually in the light receiving and emitting integrated devices 21, 22, configured so that the output signal of CD and the output signal of DVD are outputted from output terminals connected to the respective light receiving elements, and provided with two systems of output terminals.

FIGS. 18A and 18B are views each showing connection of ICs provided in a conventional optical disk apparatus. FIG. 18A shows an optical disk apparatus 101 provided with the optical pickup 1 of the discrete package type, and FIG. 18B shows an optical disk apparatus 111 provided with the optical pickup 20 of the light receiving and emitting integrated device type.

The optical disk apparatus 101 provided with the optical pickup 1 of the discrete package type comprises the optical pickup 1, and a control circuit board portion 102. The control circuit board portion 102 includes a front-end IC 103 for an optical pickup of the discrete package type, and an IC 104 for system control.

An IC installed for connection with the optical pickup 1 of the discrete package type in the optical disk apparatus 101 is the front-end IC 103 for an optical pickup of the discrete package type that has eight terminals (A to H) corresponding, respectively, to eight output terminals disposed for the eight light receiving segments of the light receiving element 13 provided in the optical pickup 1. Since the front-end IC 103 for the optical pickup of the discrete package type has merely one system of connection terminals so as to correspond to the one system of output terminals provided in the optical pickup 1, a small-size one is used.

On the other hand, in the optical disk apparatus 111 provided with the optical pickup 20 of the light receiving and emitting integrated device type, the optical pickup 20 of the light receiving and emitting integrated device type has two systems of output terminals, that is, first-system output terminals (A to H) and second-system output terminals (A' to H'), and therefore, as an IC installed for connection with the optical pickup 20, a front-end IC 113 for both the optical pickup of the discrete package type and the optical pickup of the light receiving and emitting integrated type is used. The front-end IC 113 for both the optical pickup of the discrete package type and the optical pickup of the light receiving and emitting integrated type disposed to the control circuit board portion 112 has two systems of connection terminals so as to correspond to the two systems of output terminals of the optical pickup 20, and therefore, it can be used for both the optical pickup of the discrete package type and the optical pickup of the light receiving and emitting integrated type, but it is large in size as compared with the aforementioned front-end IC 103 for the optical pickup of the discrete package type.

The IC installed in the optical disk apparatus generates a focus servo signal and a track servo signal in accordance with outputs from an optical pickup, but when the types of optical pickups are different as mentioned before, the methods for detecting focus servo signals, operation equations generating focus servo signals and track servo signals, the numbers of output terminals of detection signals, and so on are different, with the result that there arises a problem that, depending on what type of optical pickup is installed, an operation needs to be differentiated and the number of input terminals must be changed.

In order to deal with such a problem, it is desirable that an IC installed in an optical disk apparatus be configured so as to be compatible with both the discrete package type and the type using a light receiving and emitting integrated device as shown in FIG. 18B, but the number of circuits and terminals increases, and the IC becomes large in size against miniaturization, so that there are still many cases in which an IC needs to be provided with only one input terminal and is compatible with only an optical pickup of the discrete package type is used.

A hologram laser as one of the light receiving and emitting integrated devices is highly reliable, and the knife edge method used for detection of the focus servo signal in the hologram laser has such a merit that noise of a track cross signal is hard to be superimposed on the focus servo signal, but an optical pickup using this device cannot be connected to an IC that is compatible with only an optical pickup of the discrete package type, with the result that there arises a problem that the combination with an IC is limited and design freedom is low.

Conventionally, a large number of techniques of branching or dividing light emitted from a light source and/or light emitted from a light source and reflected by an optical recording medium, and devising various methods for branching or dividing, thereby increasing the quality of a focus servo signal, a track servo signal and a reproduction signal and simplifying assembly and adjustment, have been proposed.

For example, some techniques have been proposed. In one technique, referring to Japanese Examined Patent Publication JP-B2 6-90798 (1994), a light path divider is disposed that divides a reflection light from an optical recording medium to four regions symmetrical with respect to two axes intersecting at right angles. The light path divider is configured so that the regions of one pair of the four regions forming two pairs in the light path divider come in contact with each other on a finite line segment and the regions of the other pair are isolated from each other by the one pair of regions. By detecting light divided with the light path divider with a six-division-type photodetector, stable detection of a track error and stable detection of a focus error in which wraparound of a track error is reduced to the utmost can be realized. In another technique, referring to Japanese Examined Patent Publication JP-B2 6-77335 (1994), a light receiving element is divided into four light receiving regions as well as a second diffraction element guiding a light reflected by an optical recording medium to the light receiving element is divided into three light entering regions. A zeroth-order diffraction light and ± first-order diffraction lights are caused to enter the specified light entering regions of the second diffraction grating, and lights diffracted by the second diffraction element are condensed to a specific light receiving region of the light receiving element, thereby facilitating adjustment of focus offset.

Although a lot of techniques of branching and/or dividing a light by devising an optical member as in JP-B2 6-90798, JP-B2 6-77335 and so on are disclosed, no attempt to make it possible to use an optical pickup of the type using a light receiving and emitting integrated device with an IC that is compatible with an optical pickup of the discrete package type is disclosed or suggested at all.

SUMMARY OF THE INVENTION

An object of the invention is to provide a light receiving and emitting integrated device that can be connected to an IC for an optical pickup of the discrete package type regardless of use of the knife edge method for a focus servo signal; an optical pickup provided therewith; and an optical disk apparatus.

The invention provides a light receiving and emitting integrated device for use in an optical pickup that records information on an optical recording medium and/or reproduces information recorded on an optical recording medium, the light receiving and emitting integrated device comprising:

a light source for emitting light;

a light branching element for branching the light emitted from the light source into at least three;

a light dividing element for dividing the light emitted from the light source and reflected by the optical recording medium, the light dividing element being divided into four or more regions and dividing the light into four or more; and a light receiving element, having four or more light receiving segments, for receiving light divided by the light dividing element, wherein a first light among at least three lights branched by the light branching element, divided into four or more by the light dividing element, is received and detected by the four or more light receiving segments, and a focus servo signal is obtained by a knife edge method using detection outputs from the four or more light receiving segments.

Further, in the invention, it is preferable that vicinities of edges of the respective four or more light receiving segments are irradiated with the first light which is received and detected by the four or more light receiving segments in order to obtain a focus servo signal.

Furthermore, in the invention, it is preferable that positions where light receiving regions in the vicinities of the edges of half of the light receiving segments of the four or more light receiving segments that receive the first light in the vicinities of the edges thereof occupy in beam spots of the first light, and positions where light receiving regions in the vicinities of the edges of the remaining half of the light receiving segments occupy in beam spots of the first light, are opposite to each other.

Still further, in the invention, it is preferable that the light receiving and emitting integrated device further comprises first to fourth output terminals for outputting detection outputs of the first light which is received and detected by the four or more light receiving segments as four signals.

Still further, in the invention, it is preferable that the light source emits lights of different wavelengths, first lights generated by branching each of at least two lights of different wavelengths emitted from the light source are divided into four or more by the light dividing element, and are received and detected by the four or more light receiving segments, and a focus servo signal is obtained by a knife edge method using detection outputs from the four or more light receiving elements.

Still further, in the invention, it is preferable that a single light receiving element is disposed therein, and at least two lights of different wavelengths emitted from the light source are received by the single light receiving element.

The invention provides an optical pickup that records information on an optical recording medium and/or reproduces information recorded on an optical recording medium, the optical pickup comprising: one of the light receiving and emitting integrated devices described above.

The invention provides an optical pickup that records information on an optical recording medium and/or reproduces information recorded on an optical recording medium, the optical pickup comprising:

one of the light receiving and emitting integrated devices described above; and first to fourth output circuits for outputting as four signals at least eight or more detection outputs which are outputted from the four or more light receiving segments by receiving and detecting first lights obtained by branching off by the light branching element at least two lights of different wavelengths emitted from the light source, by the four or more light receiving segments, by connecting detection circuits to each other which are connected to the light receiving segments that receive and detect each first light which is divided at the same dividing region of the light dividing element.

Still further, the invention provides an optical disk apparatus that records information on an optical recording medium and/or reproduces information recorded on an optical recording medium, the optical disk apparatus comprising:

one of the optical pickups described above; and an integrated circuit each for performing an operation for generating a focus servo signal and a track servo signal on the basis of detection signals outputted from the optical pickup, and performing operation control of the optical pickup so as to record information on the optical recording medium and/or reproduce information recorded on the optical recording medium on the basis of the respective servo signals, wherein the integrated circuit is an integrated circuit that is made on the assumption that the integrated circuit is connected to an optical pickup of a discrete package type used by combining a light emitting element as a light source and a light receiving element receiving a light reflected by the optical recording medium that are packaged individually, but is not an integrated circuit that is modified so as to be connected to an optical pickup of a type using a light receiving and emitting integrated device.

According to the invention, a light receiving and emitting integrated device is provided with a light dividing element that divides light emitted from a light source and reflected by an optical recording medium into four or more, and receives light divided by the light dividing element with four or more light receiving segments disposed to a light receiving element. The vicinities of the edges of the respective four or more light receiving segments by the four or more light receiving segments are irradiated with the light which is divided by the light dividing element in the case of receiving light. The light receiving and emitting integrated device of the invention configured so that a focus servo signal is obtained by the knife edge method using detection outputs of light received and detected by the four or more light receiving segments can be connected to an IC for an optical pickup of a discrete package type.

Further, according to the invention, positions where light receiving regions in the vicinities of the edges of half of the light receiving segments of the four or more light receiving segments that receive the first light in the vicinities of the edges thereof occupy in beam spots of the first light, and positions where light receiving regions in the vicinities of the edges of the remaining half of the light receiving segments occupy in beam spots of the first light, are opposite to each other. Consequently, positions of light receiving regions that the respective halves of the light receiving segments of the four or more light receiving segments that receive the first light occupy in beam spots of the first light can become symmetrical to each other, so that it is possible to increase the accuracy of a focus servo signal obtained using detection outputs of the light receiving segments.

Furthermore, according to the invention, the light receiving and emitting integrated device is provided with first to fourth output terminals for outputting detection outputs of light which is received and detected by the four or more light receiving segments as four signals, so that it can be connected to an IC for an optical pickup of a discrete package type.

Still further, according to the invention, in the case in which a plurality of light sources that emit lights of different wavelengths, respectively, or a light source of the plural-wavelength type is provided, the device is configured so as to, regarding at least two lights of different wavelengths, divide light reflected by the optical recording medium into four or more, receive the divided light with the four or more light receiving segments, and obtain a focus servo signal by the knife edge method using detection outputs of the light which is received and detected by the four or more light receiving segments. Consequently, even a light receiving and emitting integrated device provided with a light source that emits lights of different wavelengths, respectively, can be connected to an IC for an optical pickup of a discrete package type.

Still further, according to the invention, in the case in which the light source emits a plurality of lights of different wavelengths but a single light receiving element is disposed, it can be connected to an IC for an optical pickup of the discrete package type, by configuring it so as to obtain a focus servo signal by the knife edge method using signals detected from the at least four or more light receiving segments of the light receiving element.

According to the invention, an optical pickup that can be connected to and employ not only a light emitting element and a light receiving element that are discrete-packaged but, instead thereof, a light receiving and emitting integrated device is provided.

Further, according to the invention, in the case in which light receiving elements that are compatible with at least two lights of different wavelengths, respectively, are provided, detection outputs received and detected by the at least four or more light receiving segments are eight or more for at least two. The optical pickup comprises first to fourth output circuits for outputting at least eight or more detection outputs as four signals by connecting detection circuits to each other which are connected to light receiving segments that receive and detect each first light which is divided at the same dividing region of the light dividing element. Thereby, it can be connected to an IC for an optical pickup of the discrete package type.

Furthermore, according to the invention, by configuring an optical disk apparatus in which one of the optical pickups described above is provided as well as an IC for an optical pickup of a discrete package type is installed, the need for use of a special IC that is modified so as to be connected to an optical pickup of a type using a light receiving and emitting integrated device is eliminated. Therefore, it is possible to make the respective ICs small in size. Moreover, since the optical pickup of the type using a light receiving and emitting integrated device is highly reliable as compared with the optical pickup of the discrete package type, it becomes possible to realize a small-size, thin-type and highly reliable optical disk apparatus that has not appeared before.

BRIEF DESCRIPTION OF THE DRAWINGS

Other and further objects, features, and advantages of the invention will be more explicit from the following detailed description taken with reference to the drawings wherein:

FIGS. 1A and 1B are system views each showing the configuration of an optical pickup according to one embodiment of the invention in a simplified manner;

FIGS. 2A and 2B are views each showing a state in which light reflected by an optical recording medium is divided with a first hologram element and caused to be incident on a first light receiving element;

FIGS. 3A to 3C are views showing states of light caused to be incident on the first light receiving element at the time of focus and at the time of defocus;

FIG. 4 is a view illustrating output of light reception detection signals of a first light;

FIG. 6 is a plan view showing the configuration of the first hologram element and a first light receiving element provided in an optical pickup according to another embodiment of the invention;

FIGS. 7A to 7C are views showing states of the light caused to be incident on the first light receiving element at the time of focus and at the time of defocus;

FIGS. 17A to 17C are views showing states of light caused to be incident on the first-light receiving element at the time of focus and at the time of defocus.

DETAILED DESCRIPTION

Figure 5:
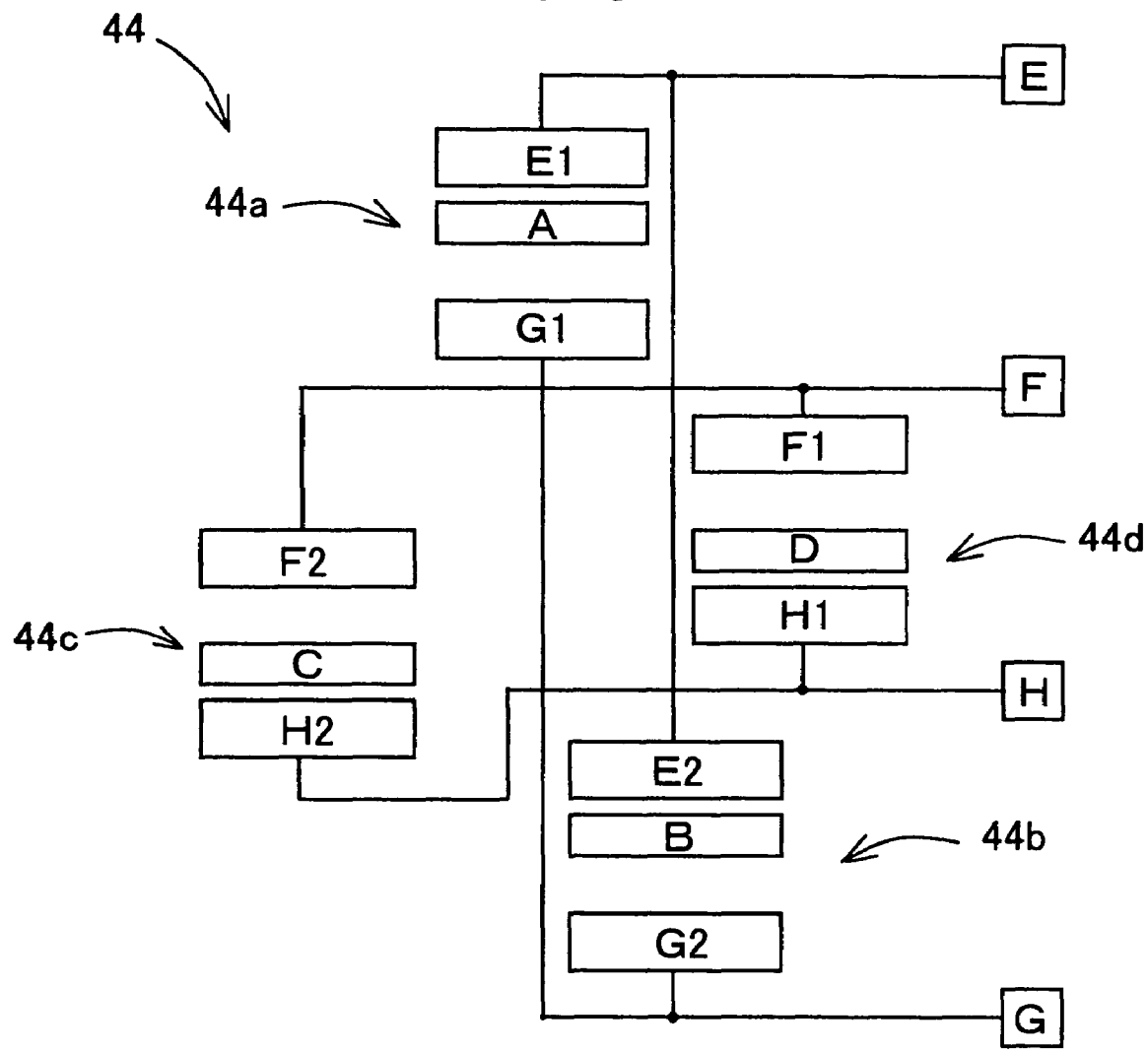
FIG. 5 is a view illustrating output of light reception detection signals of the second and third lights.

Now referring to the drawings, preferred embodiments of the invention are described below.

Figure 14:
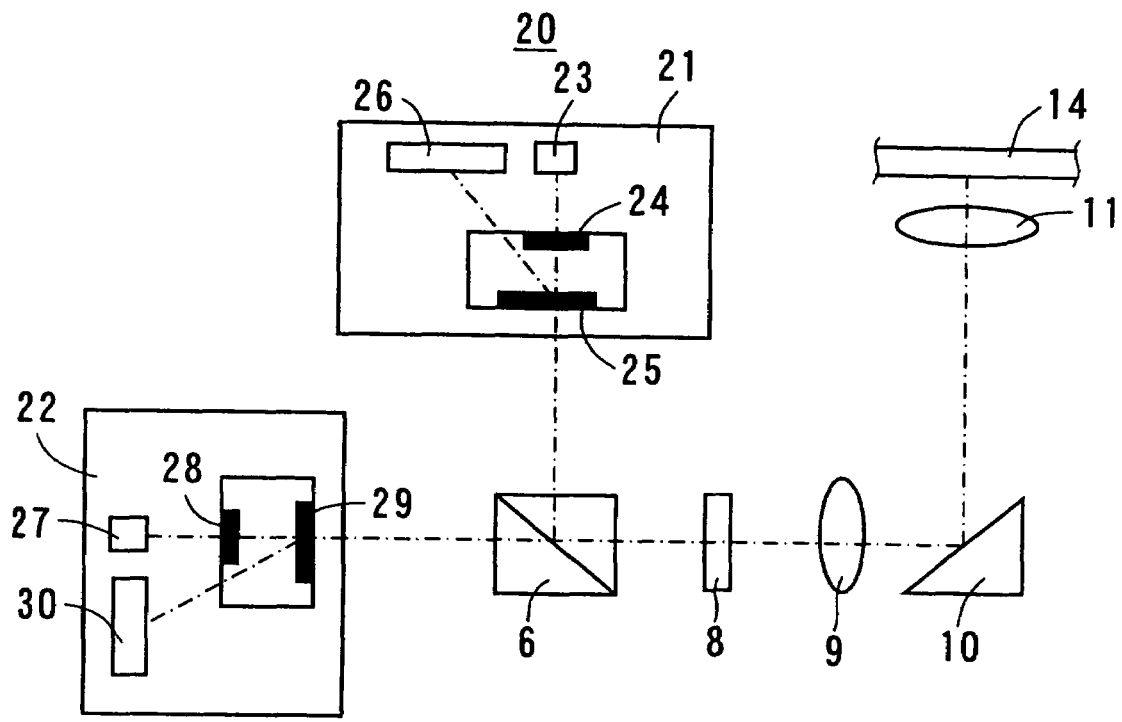
FIG. 14 is a system view showing the configuration of a conventional optical pickup of a type using a light receiving and emitting integrated device in a simplified manner.
Figure 15:
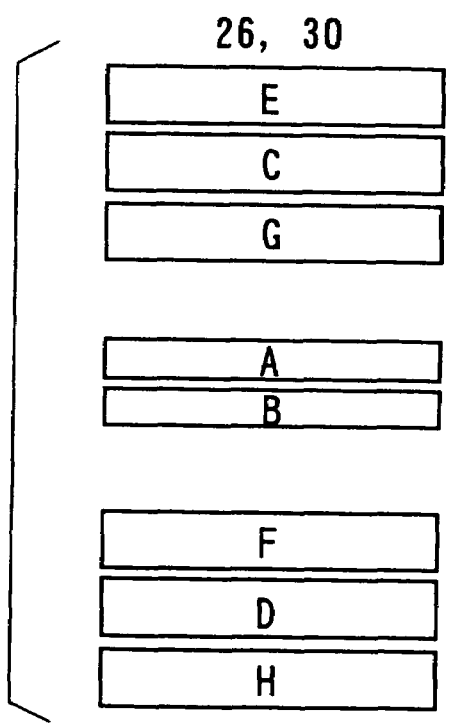
FIG. 15 is a plan view showing the configuration of a light receiving element provided in the optical pickup shown in FIG. 14.
Figure 16B:
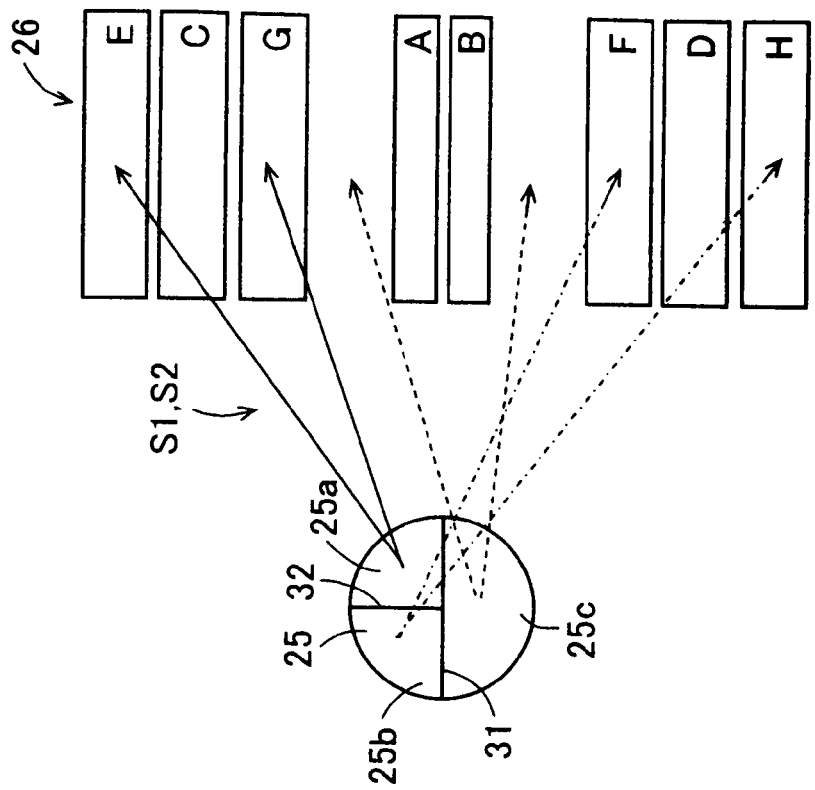
FIGS. 16A and 16B are views each showing a state in which light reflected by an optical recording medium is divided with the first hologram element and caused to be incident on the first light receiving element.
Figure 16A:
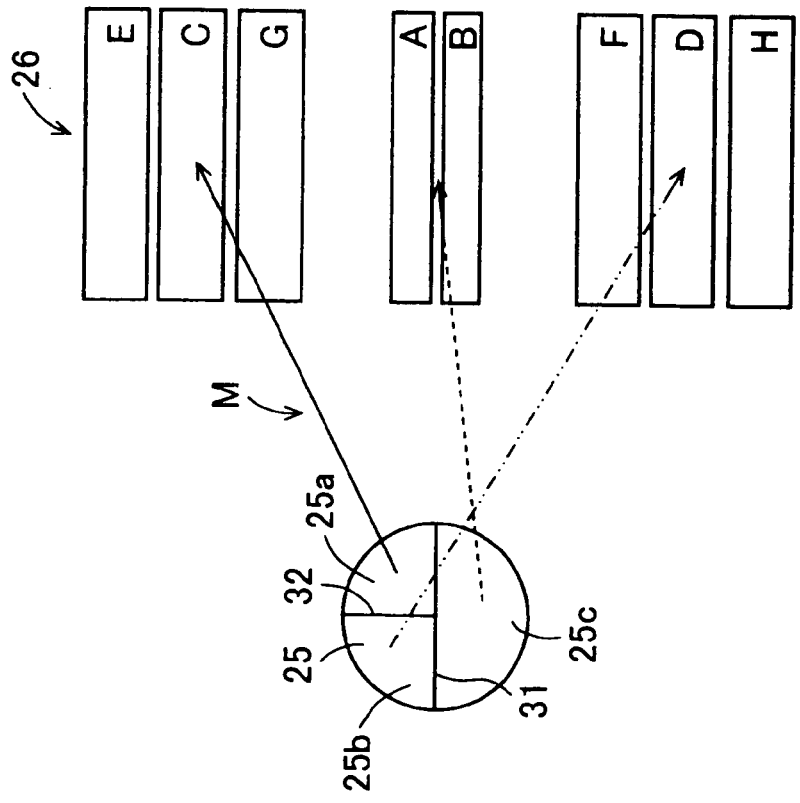

FIGS. 1A and 1B are system views each showing the configuration of an optical pickup 40 according to one embodiment of the invention in a simplified manner. Since the optical pickup 40 of the embodiment is similar to the aforementioned optical pickup 20 of the type using a light receiving and emitting integrated device shown in FIG. 14, corresponding portions will be denoted by the same reference numerals, and the description thereof will be omitted.

What is notable in the optical pickup 40 is that first and second light receiving and emitting integrated devices 41, 42 according to another embodiment of the invention are provided therein. The first and second light receiving and emitting integrated devices 41, 42 are featured by first and second hologram devices 43, 45 and first and second light receiving devices 44, 46 provided therein, respectively. Since the first and second light receiving and emitting integrated devices 41, 42 are configured in the same manner, the configurations thereof will be described by using the first light receiving and emitting integrated device 41 as a representative example.

The first light receiving and emitting integrated device 41 comprises the first semiconductor laser 23 serving as a light source that emits light; the first diffraction grating 24 serving as a light branching element that diffracts the light emitted from the first semiconductor laser 23 and branches into at least three lights, that is, first to third lights; the first hologram element 43 serving as a light dividing element that divides the light emitted from the first semiconductor laser 23 and reflected by the optical recording medium 14; and the first light receiving element 44 that receives light divided by the first hologram element 43.

In the embodiment, the first semiconductor laser 23 emits a red light as in the aforementioned optical pickup 20. The first diffraction grating 24 branches a light emitted from the first semiconductor laser 23 into at least three, that is, a zeroth-order diffracted light and ± first-order diffracted lights. The zeroth-order diffracted light will be referred to as a first light (referred to as a main beam M in some cases), and the ± first-order diffracted lights will be referred to as second and third lights (referred to as sub beams S1, S2 in some cases).

In FIG. 1B, the configuration of the first hologram element 43 and the first light receiving element 44 provided in the first light receiving and emitting integrated device 41 is shown by a plan view. The first hologram element 43 has a plane shape formed into a circle, and is divided into four regions, that is, first to fourth regions 43a, 43b, 43c, 43d by two dividing lines, that is, first and second dividing lines 47, 48 that pass through the center of the circle and intersect each other at right angles. The first dividing line 47 divides the first hologram element 43 into two parts, that is, part of the first and fourth regions 43a, 43d and part of the third and second regions 43c, 43d, and the second dividing line 48 further divides the regions divided with the first dividing line 47, that is, divides to the first region 43a and the fourth region 43d as well as divides to the third region 43c and the second region 43b. The first hologram element 43 divides each of the first to third lights that are reflected by the optical recording medium 14, respectively, into four at the first to fourth regions 43a, 43b, 43c, 43d, and causes the light to be incident on the first light receiving element 44.

The first light receiving element 44 is provided with four or more light receiving segments each made of a photoelectric transducer such as a photodiode, in the embodiment, provided with twelve light receiving segments (A, B, C, D, E1, E2, F1, F2, G1, G2, H1, H2), and detects light caused to be incident thereon through the first hologram element 43.

In the embodiment, each of the light receiving segments has a plane shape formed into a rectangle, and the twelve light receiving segments (A, B, C, D, E1, E2, F1, F2, G1, G2, H1, H2) are placed so as to be separated into first to fourth light receiving segment groups 44a, 44b, 44c, 44d each consisting of three of the light receiving segments. That is to say, the first to fourth light receiving segment groups 44a, 44b, 44c, 44d are: the first light receiving segment group 44a that receives light divided at the first region 43a of the first hologram element 43; the fourth light receiving segment group 44d that receives light divided at the fourth region 43d of the first hologram element 43; the second light receiving segment group 44b that receives light divided at the second region 43b of the first hologram element 43; and the third light receiving segment group 44c that receives light divided at the third region 43c of the first hologram element 43, which are placed clockwise in this order.

The first light receiving segment group 44a includes the light receiving segments (E1, A, G1), the second light receiving segment group 44b includes the light receiving segments (E2, B, G2), the third light receiving segment group 44c includes the light receiving segments (F2, C, H2), and the fourth light receiving segment group 44d includes the light receiving segments (F1, D, H1). The three light receiving segments composing each of the light receiving segment groups are arranged in a direction parallel to a direction in which the second dividing line 48 of the first hologram element 43 extends, and arranged so that each of the light receiving segments (A, B, C, D) receiving the first light locates in the middle.

FIGS. 2A and 2B are views each showing a state in which light reflected by the optical recording medium 14 is divided with the first hologram element 43 and caused to be incident on the first light receiving element 44, and FIGS. 3A to 3C are views showing states of light caused to be incident on the first light receiving element 44 at the time of focus and at the time of defocus. FIG. 2A shows a state in which the first light (main beam M) among lights reflected by the optical recording medium 14 is incident on the first light receiving element 44, and FIG. 2B shows a state in which the second and third lights (sub beams S1, S2) among lights reflected by the optical recording medium 14 are incident on the first light receiving element 44.

The first light entering the first hologram element 43 that has been diffracted by the first diffraction grating 24 and reflected by the optical recording medium 14 is divided into four light by the first to fourth regions 43a, 43b, 43c, 43d of the first hologram element 43, with the result that the first light divided at the first region 43a is incident on the light receiving segment (A), the first light divided at the second region 43b is incident on the light receiving segment (B), the first light divided at the third region 43c is incident on the light receiving segment (C), and the first light divided at the fourth region 43d is incident on the light receiving segment (D). In the first light receiving and emitting integrated device 41, placement of the first hologram element 43 and the first light receiving element 44 is determined so that, in the case of causing the first light which is divided into four by the first hologram element 43 to be incident on the four light receiving segments (A, B, C, D), the first light is caused to be incident on the vicinities of the edges of the four light receiving segments (A, B, C, D), respectively.

The second and third lights entering the first hologram element 43 having been diffracted by the first diffraction grating 24 and reflected by the optical recording medium 14 are divided into four at the first to fourth regions 43a, 43b, 43c, 43d of the first hologram element 43, respectively, with the result that the second and third lights divided at the first region 43a are caused to be incident on the light receiving segments (E1), (G1), respectively, the second and third lights divided at the second region 43b are caused to be incident on the light receiving segments (E2), (G2), respectively, the second and third lights divided at the third region 43c are caused to be incident on the light receiving segments (F2), (H2), respectively, and the second and third lights divided at the fourth region 43d are caused to be incident on the light receiving segments (F1), (H1), respectively.

In the optical pickup 40 of the type using a light receiving and emitting integrated device of the embodiment, a focus servo signal is obtained by the knife edge method using detection outputs of the first light being incident on the vicinities of the edges of the respective light receiving segments (A, B, C, D) of the first light receiving element 44. In the knife edge method, the first to third lights form substantially circular shapes on the first light receiving element 44 at the time of focus, and the first to third lights form shapes dependent on the shapes of the respective regions of the first hologram element 43 on the first light receiving element 44 at the time of defocus.

Hereinafter, output of a light reception detection signal in the first light receiving element 44 will be described. FIG. 4 is a view illustrating output of light reception detection signals of the first light, and FIG. 5 is a view illustrating output of light reception detection signals of the second and third lights.

In the first light receiving and emitting integrated device 41, first to fourth output terminals (denoted by the same symbols A, B, C, D as the symbols denoting the light receiving segments for convenience's sake) that correspond to the respective four light receiving segments (A, B, C, D) are disposed. Detection outputs of the first light received and detected at the four light receiving segments (A, B, C, D), respectively, are outputted as four signals from the first to fourth output terminals (A, B, C, D) that correspond to the respective light receiving segments.

As FIG. 3B shows a typical example at the time of focus, the four light receiving segments (A, B, C, D) receive the first light which is divided into four by the first hologram element 43 in the vicinities of the edges thereof, respectively. Positions where light receiving regions in the vicinities of the edges of the light receiving segments (A, B), which are half of the four light receiving segments (A, B, C, D), occupy in beam spots of the first light are the upper portions of the beam spots (in the case of defining the upper and lower sides facing the sheet surfaces of FIGS. 3A to 3C), and positions where light receiving regions in the vicinities of the edges of the light receiving segments (C, D), which are the remaining half, occupy in beam spots of the first light are the lower portions of the beam spots, so that they are opposite to each other. Therefore, by performing an operation of an equation (7) using detection signals (the signals will be denoted by adding "S" to each of the symbols denoting the light receiving segments in the same manner as mentioned before) obtained from the respective light receiving segments, it is possible to obtain a focus servo signal.

$$\text{Focus servo signal } FES=(SA+SC)-(SB+SD) \tag{7}$$

From the foregoing, the optical pickup 40 of the embodiment is the type using a light receiving and emitting integrated device, in which a focus servo signal is obtained by the knife edge method, but it is possible to obtain a focus servo signal by the same operation as in an optical pickup of the discrete package type.

Further, the first light receiving and emitting integrated device 41 is further provided with four output terminals (denoted by the same symbols E, F, G, H as the symbols denoting the light receiving segments for convenience's sake). The respective light receiving segments and the output terminals (E, F, G, H) are connected so as to obtain the following outputs. Detection signals of the second light divided at the first region 43a and caused to be incident on the light receiving segment (E1) and the second light divided at the second region 43b and caused to be incident on the light receiving segment (E2) are outputted from the output terminal E. Detection signals of the second light divided at the fourth region 43d and caused to be incident on the light receiving segment (F1) and the second light divided at the third region 43c and caused to be incident on the light receiving segment (F2) are outputted from the output terminal F. Detection signals of the third light divided at the first region 43a and caused to be incident on the light receiving segment (G1) and the third light divided at the second region 43b and caused to be incident on the light receiving segment (G2) are outputted from the output terminal G. Detection signals of the third light divided at the fourth region 43d and caused to be incident on the light receiving segment (H1) and the third light divided at the third region 43c and caused to be incident on the light receiving segment (H2) are outputted from the output terminal H.

A track servo signal can be obtained by performing an operation of an equation (8) or an equation (9) using detection signals outputted from the four output terminals (A, B, C, D) pertaining to the first light mentioned previously and detection signals outputted from the four output terminals (E, F, G, H) pertaining to the second and third lights.

Track servo signal $DPP=(SA+SB)-(SC+SD)-k\{(SE-SF)+(SG-SH)\}$ (8)

Track servo signal $DPD=(SA+SC)-(SB+SD)$(Operation of phase difference) (9)

From the foregoing, in the optical pickup 40 of the embodiment, it is also possible to obtain a track servo signal by performing the same operation as in an optical pickup of the discrete package type.

That is to say, it is possible to make the output terminal of a signal detected by the first light receiving and emitting integrated device 41 provided in the optical pickup 40 have the same configuration as the configuration of an output terminal of a detection signal in an optical pickup of the discrete package type, so that the connection with an IC for an optical pickup of the discrete package type becomes possible.

FIG. 6 is a plan view showing the configuration of the first hologram element 43 and a first light receiving element 44 provided in an optical pickup according to another embodiment of the invention. Since the first hologram element 43 and the first light receiving element 44 provided in the optical pickup of the embodiment are the same as, or similar to, the respective portions provided in the optical pickup 40 of the first embodiment, corresponding portions will be denoted by the same reference numerals, and the description thereof will be omitted.

In the embodiment, each of the light receiving segments has a plane shape formed into a rectangle, and the twelve light receiving segments (A, B, C, D, E1, E2, F1, F2, G1, G2, H1, H2) are arranged in four rows and four columns including blank portions. Expressing the arrangement of the light receiving segments with only the symbols denoting the light receiving segments hereinafter: (E1), (F1), (F2), (E2) are arranged in first to fourth columns of a first row; (A), (blank portion), (blank portion), (B) are arranged in first to fourth columns of a second row; (blank portion), (D), (C), (blank portion) are arranged in first to fourth columns of a third row; and (G1), (H1), (H2), (G2) are arranged in first to fourth columns of a fourth row.

The twelve light receiving segments are divided into two groups, that is, a first light receiving segment group 51 and a second light receiving segment group 52, by a virtual dividing line 50 that extends in a direction parallel to the first dividing line 47 dividing the first hologram element 43, between the second row and the third row of the matrix arrangement. The six light receiving segments (A, B, E1, E2, F1, F2), which are half of the twelve, belong to the first light receiving segment group 51, and the remaining six light receiving segments (D, C, G1, G2, H1, H2) belong to the second light receiving segment group 52. The light receiving segment (A) and the light receiving segment (D) are arranged in a staggered manner on both sides of the virtual dividing line 50, and the light receiving segment (C) and the light receiving segment (B) are arranged in a staggered manner on both sides of the virtual dividing line 50. The light receiving segment (A) and the light receiving segment (B) are located on the same side with respect to the virtual dividing line 50, and the light receiving segment (D) and the light receiving segment (C) are located on the same side with respect to the virtual dividing line 50. The first light, the second light and the third light divided at the first to fourth regions 43a, 43b, 43c, 43d of the first hologram element 43 are incident on the respective light receiving segments that are associated with the same symbols as described in the aforementioned first embodiment, respectively.

FIGS. 7A to 7C are views showing states of the light caused to be incident on the first light receiving element 44 at the time of focus and at the time of defocus. In the optical pickup of the embodiment, as well as in the aforementioned first embodiment, a focus servo signal and a track servo signal can be obtained by performing the same operations as in an optical pickup of the discrete package type.

That is to say, it is possible to make the output terminal of a signal detected by the first light receiving and emitting integrated device provided in the optical pickup have the same configuration as the configuration of an output terminal of a detection signal in the optical pickup of the discrete package type, so that the connection with an IC for the optical pickup of the discrete package type becomes possible. Moreover, since the respective segments are arranged in four rows and four columns including blank portions in the embodiment, the area that occupies on the first light receiving element 44 can be small, and the first light receiving element 44 becomes small in size, with the result that it becomes possible to make the optical pickup itself small in size.

Figure 8:
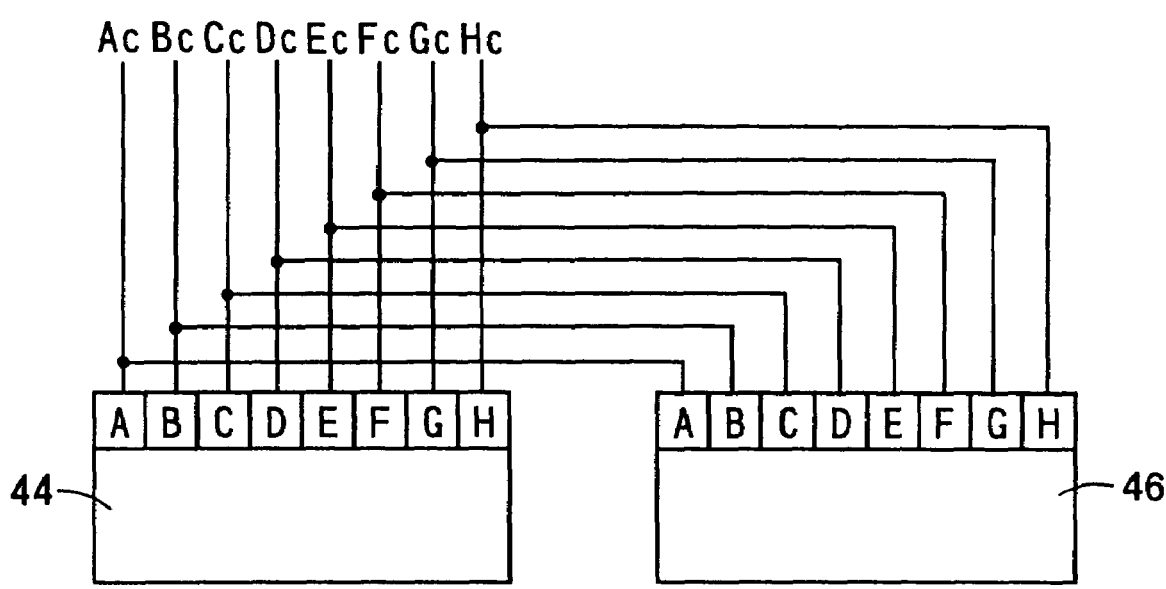
FIG. 8 is a view showing the connection state of detection circuits of the first and second light receiving and emitting integrated devices.

FIG. 8 is a view showing the connection state of detection circuits of the first and second light receiving and emitting integrated devices 41, 42. As mentioned before, the second light receiving and emitting integrated device 42 is configured in the same manner as the first light receiving and emitting integrated device 41. Therefore, in the optical pickup 40, eight signals are outputted from the first light receiving and emitting integrated device 41, and eight signals are outputted from the second light receiving and emitting integrated device 42. Accordingly, the number of output terminals that deal with the respective detection outputs of the first and second light receiving and emitting integrated devices 41, 42 is sixteen, which is obtained by 8 (A to H)×2=16, and consequently, the number of detection circuits that deal with all the detection outputs is also sixteen.

However, in the optical pickup 40 of the embodiment, as shown in FIG. 8, in the detection circuits of the first light receiving and emitting integrated device 41 and the second light receiving and emitting integrated device 42, the detection circuits connected to the light receiving segments that receive and detect each light which is divided at the same dividing regions of the first and second hologram elements 43, 45 are connected to each other, whereby although the two light receiving and emitting integrated devices 41, 42 are provided, it becomes possible to output detection signals from each of the first and second light receiving and emitting integrated devices 41, 42 with eight output circuits (Ac, Bc, Cc, Dc, Ec, Fc, Gc, Hc)

That is to say, detection signals of the first light are outputted from the four output circuits (Ac, Bc, Cc, Dc), and detection signals of the second and third lights are outputted from the remaining four output circuits (Ec, Fc, Gc, Hc).

In the case of disposing two light receiving and emitting integrated devices and connecting detection circuits of light receiving elements disposed in the respective light receiving and emitting integrated devices as described above, in order to make the output of one of the light receiving elements hard to affect the output of the other light receiving element, it is desirable that the output of an unused light receiving element can be brought into a high impedance state.

Figure 9:
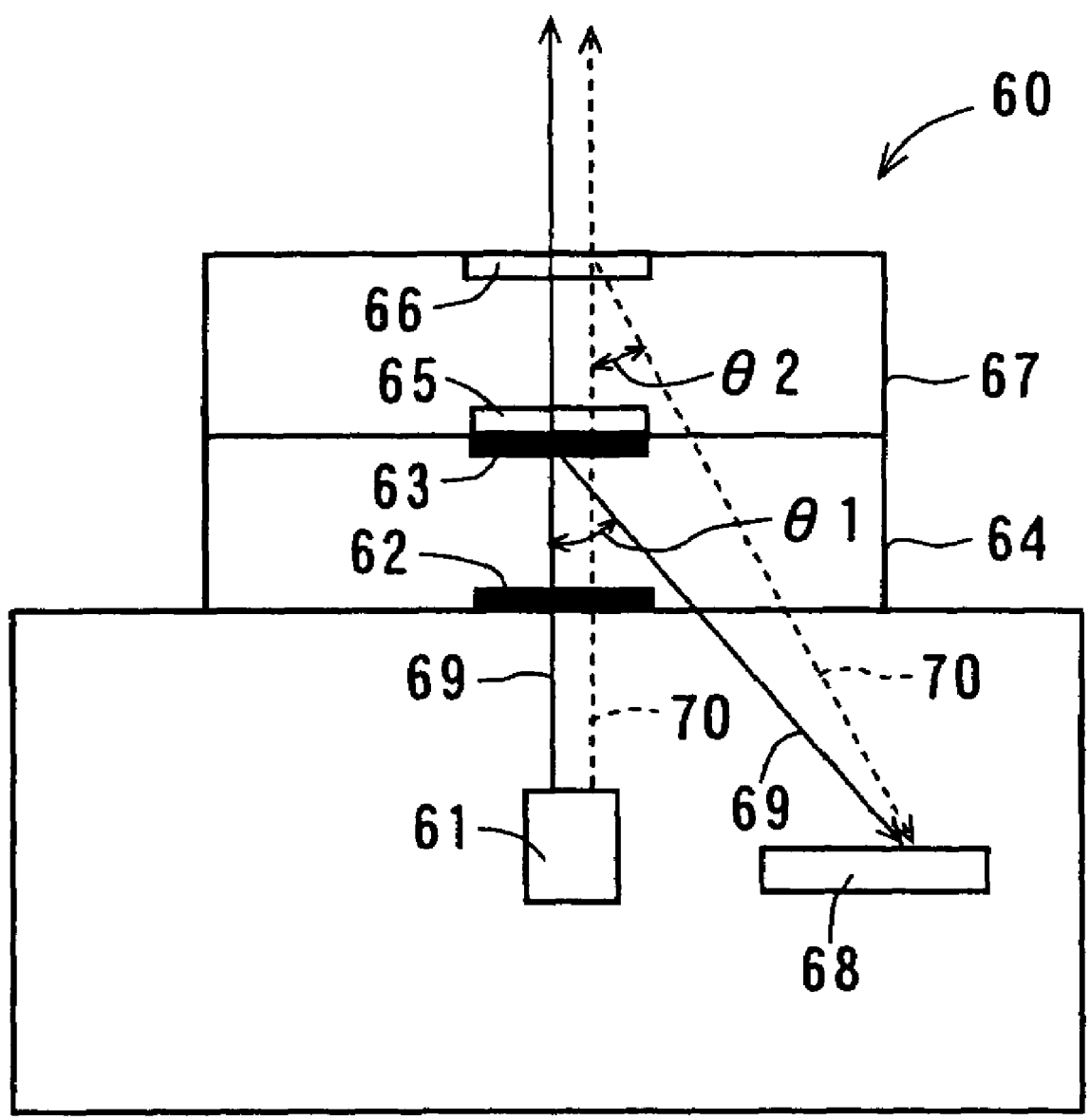
FIG. 9 is a view showing the configuration of a light receiving and emitting integrated device according to a modified example of another embodiment of the invention in a simplified manner.

FIG. 9 is a view showing the configuration of a light receiving and emitting integrated device 60 according to a modified example of another embodiment of the invention in a simplified manner. The light receiving and emitting integrated device 60 of the embodiment comprises a two-wavelength semiconductor laser 61 serving as a light source in which semiconductor lasers that emit lights of different wavelengths, respectively are integrated; a first optical member 64 that is provided with a first diffraction grating 62 and a first hologram element 63; a second optical member 67 that is provided with a second diffraction grating 65 and a second hologram element 66; and a single light receiving element 68.

The two-wavelength semiconductor laser 61 is such that laser chips-capable of emitting first and second wavelength lights 69, 70 of different wavelengths, respectively, such as an infrared light for a CD and a red light for a DVD, are incorporated integrally. In the light receiving and emitting integrated device 60 of the embodiment, the first optical member 64 and the second optical member 67 are integrated in the traveling direction of the first wavelength light 69 or the second wavelength light 70 emitted from the two-wavelength semiconductor laser 61, and the first optical member 64 is placed closer to the two-wavelength semiconductor laser 61 than the second optical member 67. When they are placed in this manner, the first and second hologram elements 63, 66 are selected so that a diffraction angle θ1 of the first wavelength light 69 by the first hologram element 63 provided in the first optical member 64 becomes larger than a diffraction angle θ2 of the second wavelength light 70 by the second hologram element 66 provided in the second optical member 67.

The only one light receiving element 68 provided therein is configured in the same manner as the aforementioned first light receiving element 44, and the configuration of an output terminal of a detection signal is also the same. The light receiving element 68 is disposed in a position in which the light path of the first wavelength light 69 diffracted by the first hologram element 63 and the light path of the second wavelength light 70 diffracted by the second hologram element 66 coincide, and is capable of receiving and detecting both the lights 69, 70 diffracted by the hologram elements 63, 66.

In the light receiving and emitting integrated device 60 thus configured, the lights 69, 70 of different wavelengths are emitted from the two-wavelength semiconductor laser 61, respectively, but even when either wavelength of light is emitted to reproduce information recorded on an optical recording medium, it is possible to receive and detect the light with the single light receiving element 68, and obtain a focus servo signal and a track servo signal by performing operations of the equations (7) to (9) mentioned previously with detection signals outputted from eight output terminals connected to the light receiving element 68. Therefore, an optical pickup provided with the light receiving and emitting integrated device 60 of the embodiment can be connected to an IC for the optical pickup of the discrete package type.

Figure 10:
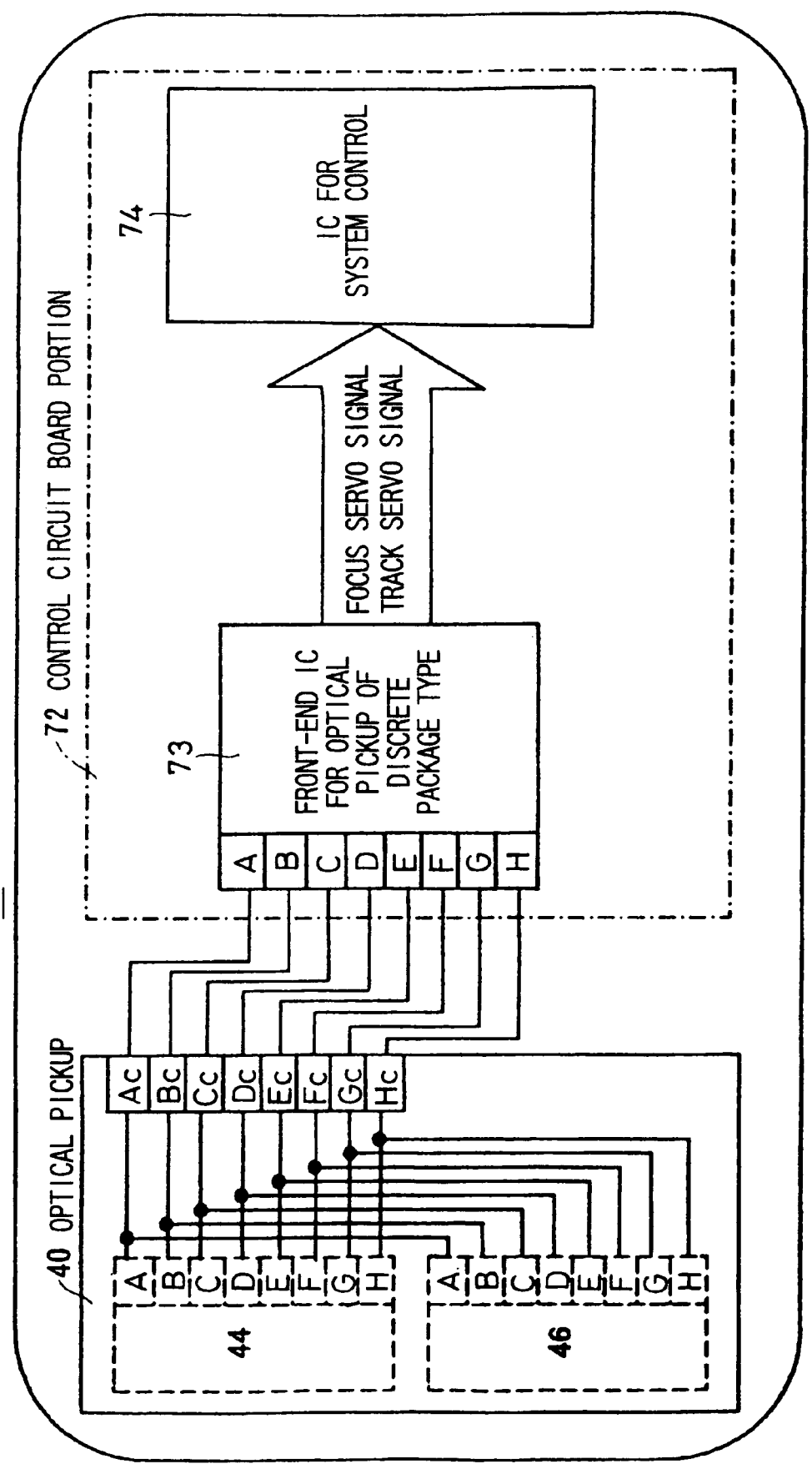
FIG. 10 is a view showing the configuration of an optical disk apparatus according to still another embodiment of the invention in a simplified manner.
Figure 11:
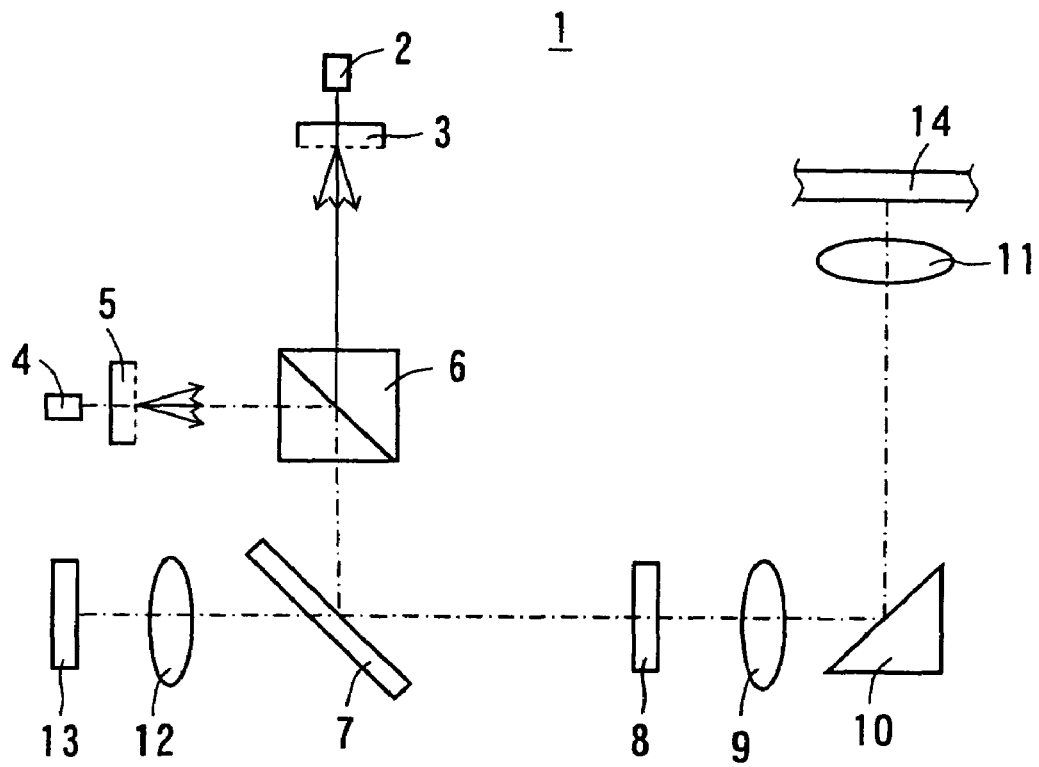
FIG. 11 is a system view showing the configuration of a conventional optical pickup of a discrete type in a simplified manner.
Figure 12:
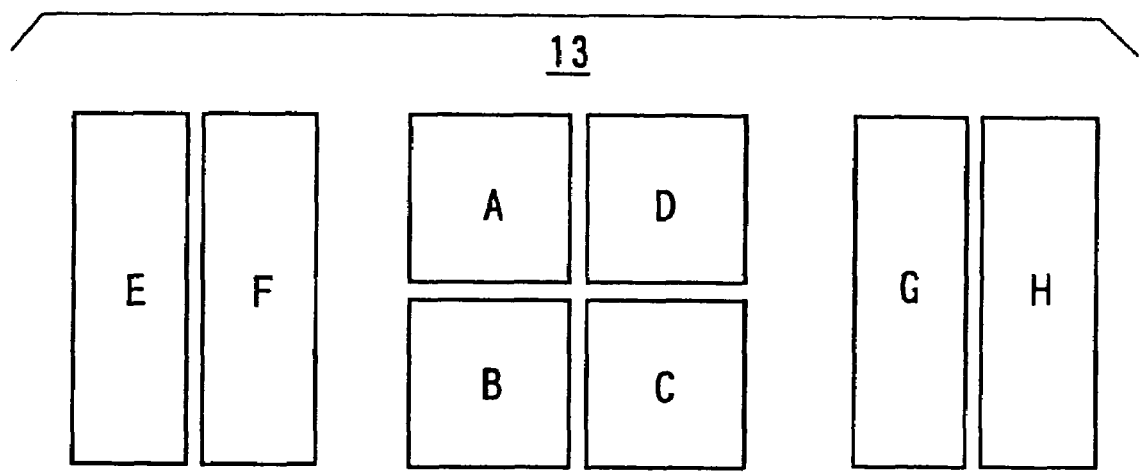
FIG. 12 is a plan view showing the configuration of a light receiving element provided in the optical pickup shown in FIG. 11.
Figure 13A:
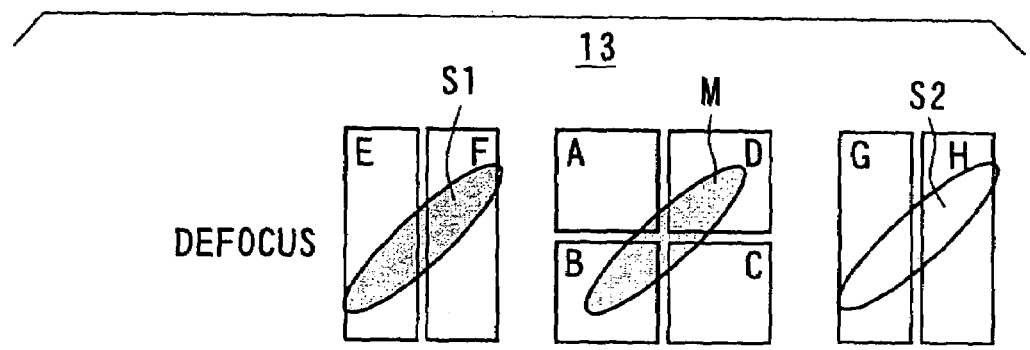
FIGS. 13A to 13C are plan views showing states in which a main beam and sub beams be incident on the light receiving element.
Figure 13B:
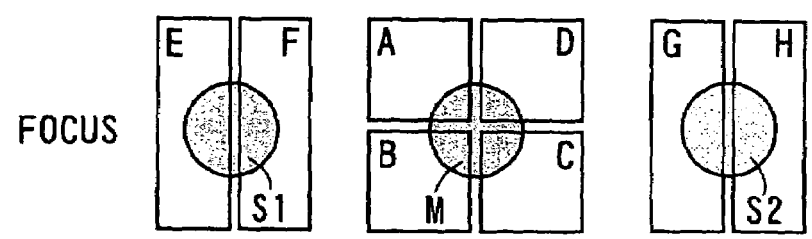
Figure 13C:
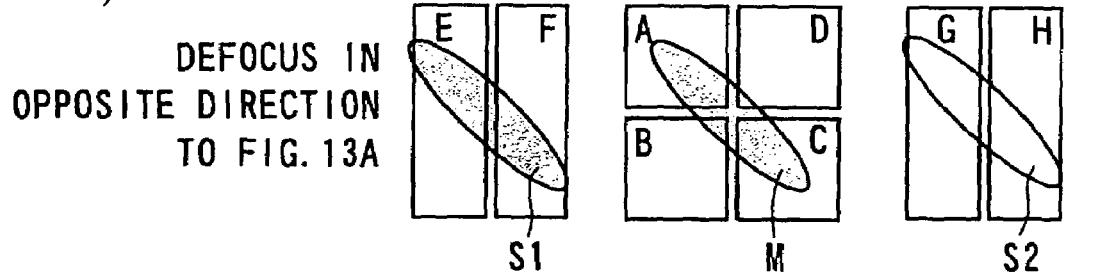

FIG. 10 is a view showing the configuration of an optical disk apparatus 71 according to still another embodiment of the invention in a simplified manner. The optical disk apparatus 71 comprises the optical pickup 40 of the one embodiment, a control circuit board portion 72, and a disk driving portion, which is not shown. The control circuit board portion 72 includes a front-end IC 73 for the optical pickup of the discrete package type provided with eight terminals (A, B, C, D, E, F, G, H) that correspond to the eight output terminals (Ac, Bc, Cc, Dc, Ec, Fc, Gc, Hc) of the optical pickup 40, and an IC 74 for system control.

Figure 18A:
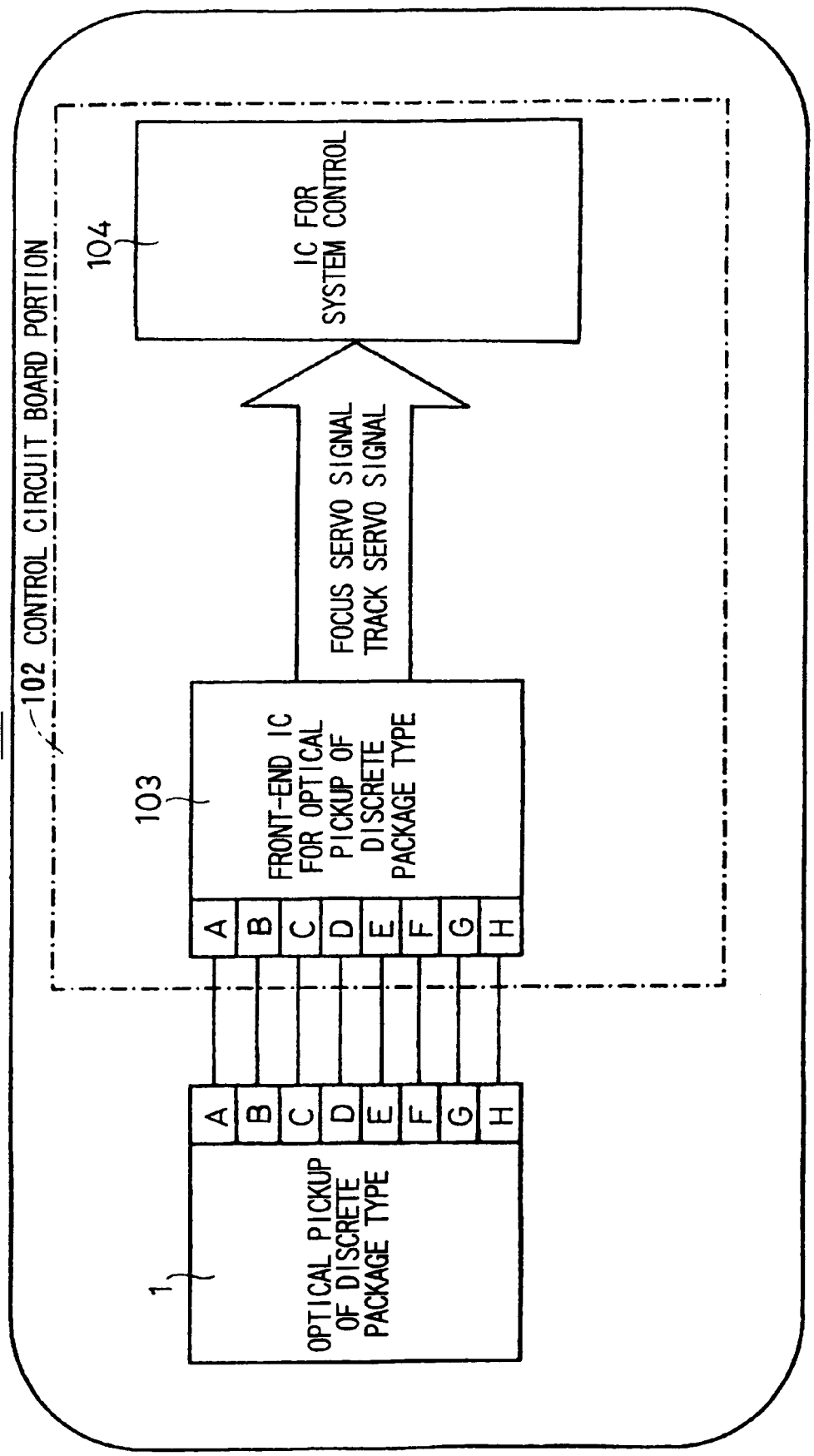
FIGS. 18A and 18B are views each showing connection of ICs provided in a conventional optical disk apparatus.
Figure 18B:
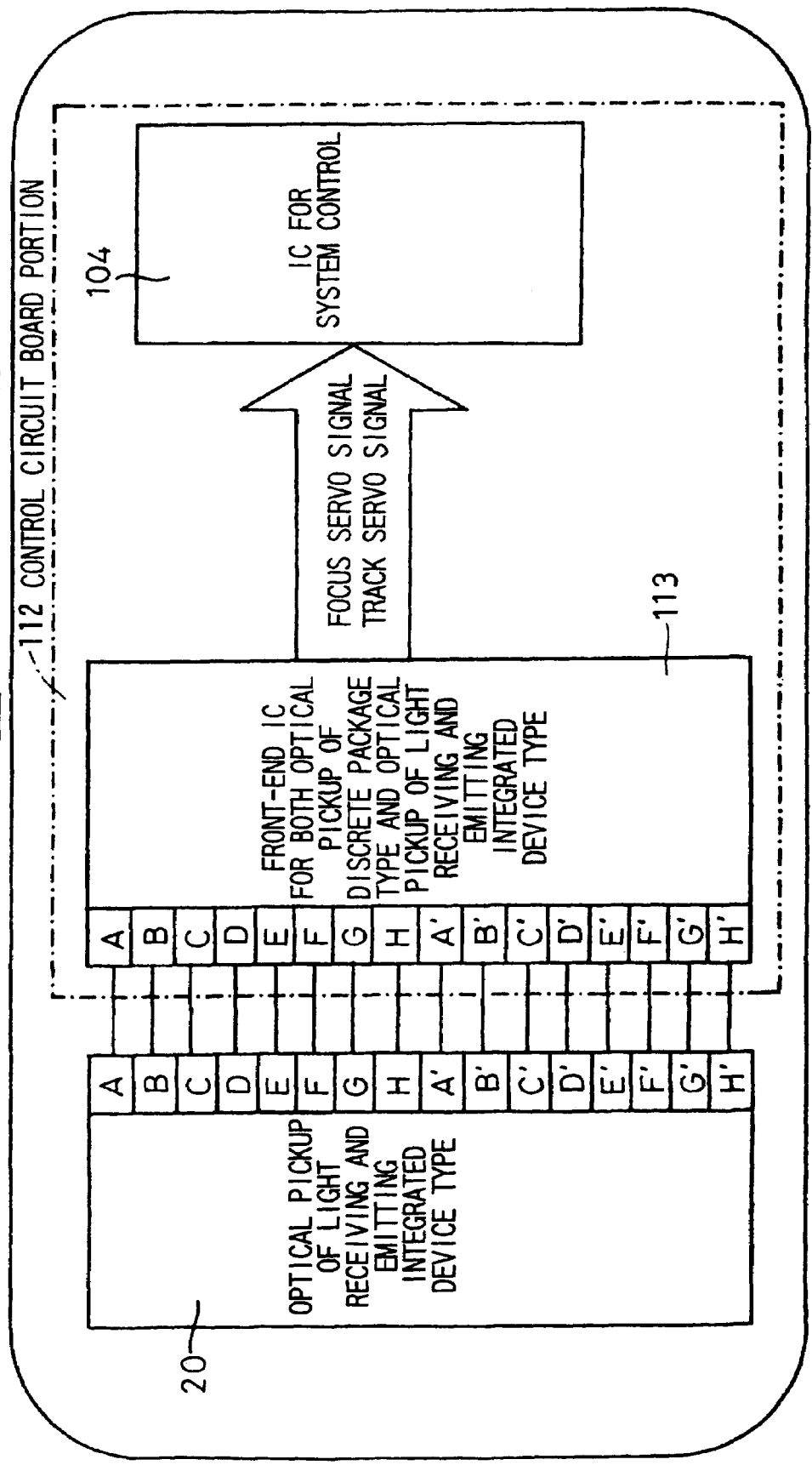

Although the optical disk apparatus 71 of the embodiment is provided with the optical pickup 40 of the light receiving and emitting integrated device type, which is highly reliable, there is no need to install such a special IC as shown in FIG. 18B described previously, that is, an IC in which an operation circuit system there inside and the number of input terminals are changed for connection with an optical pickup of the light receiving and emitting integrated device type, which is an IC that can be used for both an optical pickup of the discrete package type and an optical pickup of the light receiving and emitting integrated device type. Therefore, the optical disk apparatus 71 is characterized by a configuration in which the IC 73 for an optical pickup of the discrete package type that is general and small in size as compared with the special IC is installed therein.

In other words, the invention makes it possible to realize an optical disk apparatus that has merits of both an IC for an optical pickup of the light receiving and emitting integrated device type and an IC for an optical pickup of the discrete package type, that is, realize a small-size, thin-type and highly reliable optical disk apparatus that has not appeared before.

Although a hologram element serving as a light dividing element is divided into four regions in the embodiments described hereinbefore, it may be divided into more than four regions without being restricted by the above configuration. In this case, signals inputted into an IC can be reduced to four by choosing signals according to need, and connecting finally. Moreover, the arrangement of the light receiving segments (A, B, C, D) each detecting the main beam to obtain a focus servo signal may be changed in accordance with the pattern of a hologram element. Furthermore, although the configuration is such that outputs of detection signals of the sub beams are taken out of the four output terminals (E, F, G, H), takeout of detection signals may be two of (E+G) and (F+H) or may be two of (E−F) and (G−H) without being restricted by the above configuration.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus that records information on an optical recording medium and/or reproduces information recorded on an optical recording medium, the optical pickup apparatus comprising:

a light receiving and emitting integrated device comprising:

a light source for emitting light;

a light branching element configured to branch the light emitted from the light source into at least three lights;

a light dividing element being divided into four or more regions and configured to divide the light emitted from the light source and reflected by the optical recording medium into four or more lights; and a light receiving element, having four or more light receiving segments, configured to receive and output light divided by the light dividing element, wherein four or more lights obtained from the light dividing element dividing a first light from the at least three lights branched by the light branching element are received and detected by the four or more light receiving segments, and a focus servo signal is obtained by a knife edge method using detection outputs from the four or more light receiving segments, wherein the light source emits lights of different wavelengths and at least two first lights generated by branching each of at least two lights of different wavelengths emitted from the light source are each divided into four or more lights by the light dividing element and the four or more divided lights corresponding to each of the at least two first lights are received and detected by the four or more light receiving segments; and first to fourth output circuits configured to output as four signals at least eight or more detection outputs corresponding to the four or more lights of each of the at least two first lights which are divided at the same dividing region of the light dividing element and outputted from the four or more light receiving segments by connecting together detection circuits connected to the light receiving segments that receive and detect each of the at least two first lights.

2. The optical pickup apparatus of claim 1, wherein vicinities of edges of the respective four or more light receiving segments are irradiated with the first light which is received and detected by the four or more light receiving segments in order to obtain a focus servo signal.

3. The optical pickup apparatus of claim 2, wherein positions where light receiving regions in the vicinities of the edges of half of the light receiving segments of the four or more light receiving segments that receive the first light in the vicinities of the edges thereof occupy in beam spots of the first light, and positions where light receiving regions in the vicinities of the edges of the remaining half of the light receiving segments occupy in beam spots of the first light, are opposite to each other.

4. The optical pickup apparatus of claim 1, further comprising:

first to fourth output terminals for outputting detection outputs of the first light which is received and detected by the four or more light receiving segments as four signals.

5. The optical pickup apparatus of claim 1, wherein a single light receiving element is disposed therein, and at least two lights of different wavelengths emitted from the light source are received by the single light receiving element.

6. An optical disk apparatus that records information on an optical recording medium and/or reproduces information recorded on an optical recording medium, the optical disk apparatus comprising:

the optical pickup apparatus of claim 1; and an integrated circuit configured to perform an operation to generate a focus servo signal and a track servo signal on the basis of detection signals outputted from the optical pickup, and perform operation control of the optical pickup apparatus so as to record information on the optical recording medium and/or reproduce information recorded on the optical recording medium on the basis of the respective servo signals, wherein the optical pickup apparatus is of a discrete package type used by combining a light emitting element as a light source and a light receiving element receiving a light reflected by the optical recording medium that are packaged individually.

* * * * *